(12) United States Patent
Horiuchi et al.

(10) Patent No.: US 7,853,765 B2
(45) Date of Patent: *Dec. 14, 2010

(54) STORAGE SYSTEM AND DATA MANAGEMENT METHOD

(75) Inventors: Takeshi Horiuchi, Odawara (JP); Ryusuke Ito, Odawara (JP)

(73) Assignee: Hitachi, Ltd., Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 12/292,130

(22) Filed: Nov. 12, 2008

(65) Prior Publication Data

US 2009/0083502 A1    Mar. 26, 2009

Related U.S. Application Data

(63) Continuation of application No. 11/431,554, filed on May 11, 2006, now Pat. No. 7,472,239.

(30) Foreign Application Priority Data

Mar. 23, 2006    (JP) .............................. 2006-080169

(51) Int. Cl.
    *G06F 12/00* (2006.01)
(52) U.S. Cl. ..................... 711/161; 711/114; 711/162; 714/5; 714/6
(58) Field of Classification Search ................. 711/100, 711/114, 161–162; 714/5–6; 707/200–204
    See application file for complete search history.

(56) References Cited

U.S. PATENT DOCUMENTS

| 6,910,111 B1 | 6/2005 | Colgrove et al. |
| 6,912,629 B1 | 6/2005 | West et al. |
| 7,024,527 B1 | 4/2006 | Ohr |

(Continued)

FOREIGN PATENT DOCUMENTS

| EP | 1 562 117 A2 | 2/2004 |
| JP | 2003-122509 | 1/2002 |
| JP | 2005-011316 | 3/2004 |

OTHER PUBLICATIONS

Extended European Search Report dated Aug. 2, 2007.

*Primary Examiner*—Tuan V Thai
*Assistant Examiner*—Zhuo H Li
(74) *Attorney, Agent, or Firm*—Foley & Lardner LLP

(57) ABSTRACT

Provided are a storage system and data management method capable of improving the usage efficiency of a storage extent. With this storage system, a first storage apparatus dynamically allocates a storage extent to the first volume and sends data written by the host system in the first volume to the second storage apparatus; a second storage apparatus writes the data sent from the first storage apparatus in a corresponding position in the second volume pair-configured with the first volume and stores as management information the position to which the data from the first storage apparatus in the second volume was written; and the second storage apparatus, during the restoration processing of the first volume, refers to the management information and sends to the first storage apparatus the data in a position to which the data from the first storage apparatus in the second volume was written.

12 Claims, 19 Drawing Sheets

U.S. PATENT DOCUMENTS

| | | |
|---|---|---|
| 7,240,238 B2 | 7/2007 | Yanai et al. |
| 7,472,239 B2 * | 12/2008 | Horiuchi et al. ............. 711/161 |
| 2004/0260861 A1 | 12/2004 | Serizawa et al. |
| 2005/0108292 A1 | 5/2005 | Burton et al. |
| 2005/0120092 A1 | 6/2005 | Nakano et al. |
| 2006/0020753 A1 | 1/2006 | Cochran et al. |

* cited by examiner

FIG.3

| POOL VOL ADDRESS | PRIMARY VOL NUMBER | PRIMARY VOL ADDRESS | ------- |
|---|---|---|---|
| 1~300 | 1 | 1~300 | ------- |
| 301~600 | 1 | 301~600 | ------- |
| 601~900 | 2 | 1~300 | ------- |
| ⋮ | ⋮ | ⋮ | ⋮ |

23A  23B  23C  23

STORAGE SYSTEM AND DATA MANAGEMENT METHOD

CROSS-REFERENCES TO RELATED APPLICATIONS

This application is a Continuation of U.S. application Ser. No. 11/431,554 filed on May 11, 2006 now U.S. Pat. No. 7,472,239, and claims priority from U.S. application Ser. No. 11/431,554 filed on May 11, 2006, which claims priority from Japanese Patent Application No. 2006-80169, filed on Mar. 23, 2006, the entire disclosure of which is incorporated herein by reference.

BACKGROUND

The present invention generally relates to a storage system and a data management method, and is in particular suitable for application in a storage system where an AOU (Allocation On Use) function is provided to a storage apparatus to become a copy source, and the AOU function is not provided to a storage apparatus to become a copy destination in remote copying.

In recent years, pursuant to the development of the information society, the data volume of user data stored by users in a storage apparatus is increasing sharply, and customer needs relating to increase in capacity and improvement in usage efficiency of storage apparatuses are also increasing from the perspective of cost reduction.

Under the foregoing circumstances, in recent years, the AOU function is being proposed as one function of a storage apparatus (refer to Japanese Patent Laid-Open Publication No. 2005-11316). The AOU function is a function for presenting to a host system a virtual volume as a logical volume (hereinafter referred to as a "primary volume") for reading and writing user data, and dynamically allocating to the primary volume a real storage extent for actually storing user data according to the usage of such primary volume. According to this kind of AOU function, it is possible to efficiently use the storage extent in the storage apparatus while presenting to the host system the volume of the capacity upward of the storage extent in the storage apparatus.

Further, as another function of a storage apparatus, there is a remote copy function (refer to Japanese Patent Laid-Open Publication No. 2003-122509). The remote copy function is a function of duplicating and retaining user data written in the primary volume of one's own storage apparatus by copying such user data to a volume (hereinafter referred to as a "secondary volume") in another storage apparatus installed at a remote location on the one hand, and restoring the primary volume using backup data retained in the secondary volume when the user data in the primary volume is lost due to disaster or the like on the other hand. According to this kind of remote copy function, it is possible to create a highly reliable storage system.

SUMMARY

Meanwhile, from the perspective of customers wishing to reduce costs and improve the reliability of the storage system, it is desirable to create a storage system capable of executing the combined processing of the foregoing AOU function and remote copy function.

Nevertheless, upon combining the AOU function and remote copy function, when the AOU function is not provided to a storage apparatus (hereinafter referred to as a "secondary storage apparatus") having a secondary volume, the volume of a fixed capacity will be allocated as the secondary volume. As a result, in this system configuration, when restoring the primary volume using the user data backed up in the secondary volume, all data in the secondary volume will be copied to the primary volume, and storage extent in the same size as the capacity of the secondary volume will be allocated to the primary volume. And there is a problem in that this would impair the advantages of the AOU function.

The present invention was devised in view of the foregoing problems, and an object thereof is to provide a storage system and data management method capable of improving the usage efficiency of the storage extent.

In order to achieve the foregoing object, the present invention provides a storage system having first and second storage apparatuses, and which duplicates and retains data written by a host system in a first volume in the first storage apparatus by copying the data to a second volume in the second storage apparatus, wherein the first storage apparatus includes: a storage extent allocation unit for dynamically allocating a storage extent to the first volume; and a data sending unit for sending data written by the host system in the first volume to the second storage apparatus; wherein the second storage apparatus includes: a data write unit for writing the data sent from the first storage apparatus in a corresponding position in the second volume pair-configured with the first volume; and a data write position management unit for storing as management information the position to which the data from the first storage apparatus in the second volume was written; and wherein the second storage apparatus, during the restoration processing of the first volume, refers to the management information and sends to the first storage apparatus the data in a position to which the data from the first storage apparatus in the second volume was written.

As a result, with this storage system, during the restoration processing of the first volume, it is possible to effectively prevent a storage extent from being allocated to an extent in which data is not stored in the first volume.

Further, the present invention also provides a data management method of a storage system having first and second storage apparatuses, and which duplicates and retains data written by a host system in a first volume in the first storage apparatus by copying the data to a second volume in the second storage apparatus, including: a first step of the first storage apparatus dynamically allocating a storage extent to the first volume and sending data written by the host system in the first volume to the second storage apparatus; a second step of the second storage apparatus writing the data sent from the first storage apparatus in a corresponding position in the second volume pair-configured with the first volume and storing as management information the position to which the data from the first storage apparatus in the second volume was written; and a third step of second storage apparatus, during the restoration processing of the first volume, referring to the management information and sending to the first storage apparatus the data in a position to which the data from the first storage apparatus in the second volume was written.

As a result, with this data management method, during the restoration processing of the first volume, it is possible to effectively prevent a storage extent from being allocated to an extent in which data is not stored in the first volume.

According to the present invention, it is possible to improve the usage efficiency in the first storage apparatus since unnecessary storage extents are not allocated to the first volume during the restoration processing of the first volume.

DESCRIPTION OF DRAWINGS

FIG. 3 is a conceptual diagram showing the storage extent management table;

DETAILED DESCRIPTION

An embodiment of the present invention is now described in detail with reference to the attached drawings.

(1) Configuration of Storage System in Present Embodiment

Figure 1:
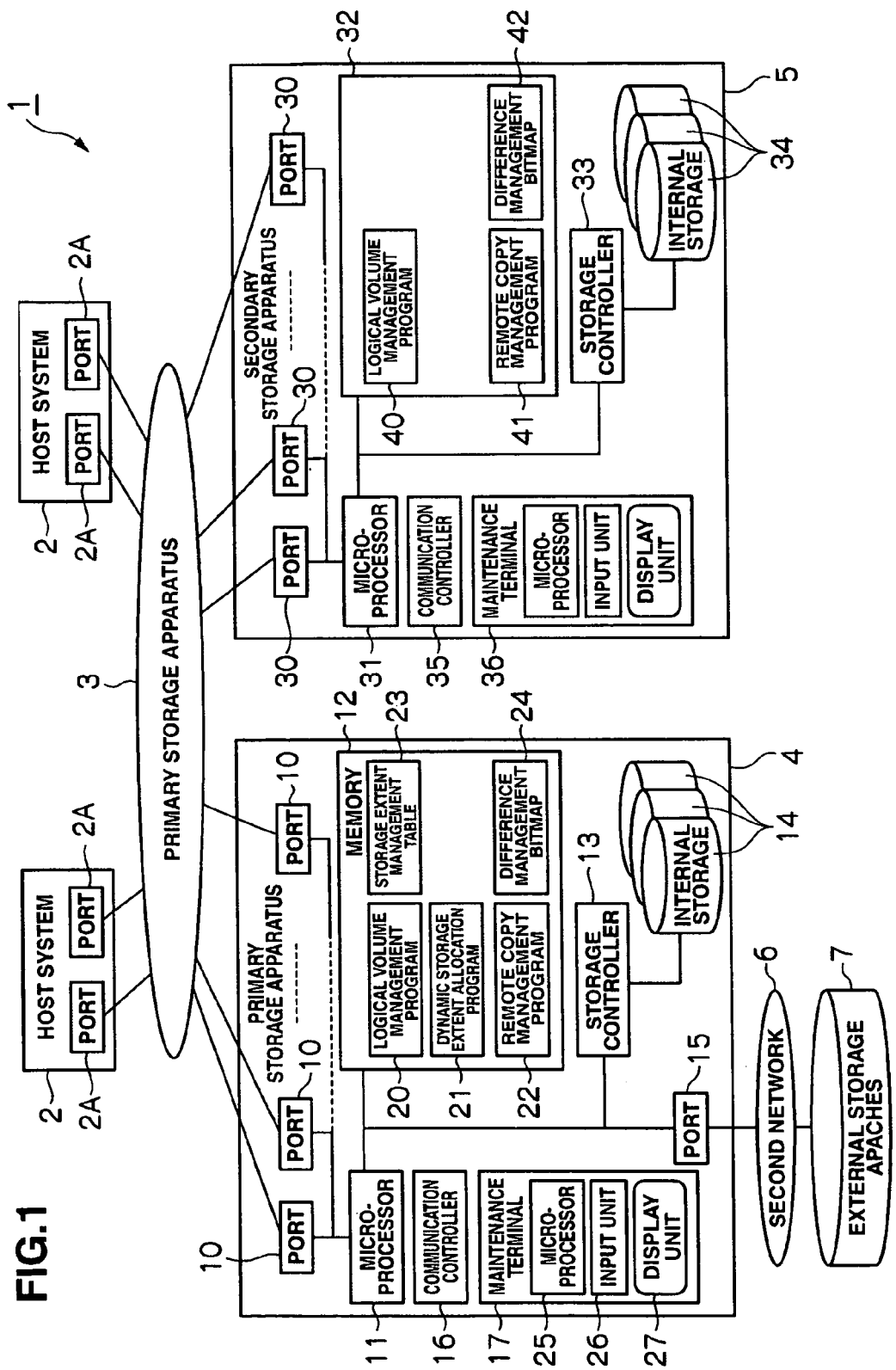
FIG. 1 is a block diagram showing the overall configuration of the storage system according to the present embodiment.

FIG. 1 shows the overall storage system 1 according to the present embodiment. This storage system 1 is configured by a plurality of host systems 2 being connected to a primary storage apparatus 4 and a secondary storage apparatus 5 via a first network 3, and an external storage apparatus 7 being connected to the primary storage apparatus 4 via a second network 6.

The host system 2 is a computer device equipped with an information processing resource such as a CPU (Central Processing Unit) and memory, and is connected to the first network 3 via a port 2A. This host system 2, for instance, is configured from a personal computer, workstation, mainframe or the like.

The first network 3, for instance, is configured from a SAN (Storage Area Network), LAN (Local Area Network), Internet, public line or dedicated line. Communication among the host system 2, primary storage apparatus 4 and secondary storage apparatus 5 via the first network 3, for example, is conducted according to a fibre channel protocol when the first network 3 is a SAN, and conducted according to a TCP/IP (Transmission Control Protocol/Internet Protocol) protocol when the first network 3 is a LAN.

The primary storage apparatus 4 has a virtualization function of virtualizing the storage extent of one's own storage apparatus and the storage extent provided by the external storage apparatus 7, and is configured by having a plurality of upper-level ports 10, a microprocessor 11, a memory 12, a storage control unit 13, a plurality of internal storages 14, a lower-level port 15, a communication control unit 16 and a maintenance terminal 17.

Each upper-level port 10 is a port to the first network 3. Each of these upper-level ports 10 is given a network address such as a WWN (World Wide Name) or IP (Internet Protocol) address for uniquely identifying the upper-level port 10 in the first network 3.

The microprocessor 11 is a processor for governing the operational control of the overall primary storage apparatus 4, and performs the various types of control processing described later by executing the control programs stored in the memory 12.

The memory 12 retains various types of control programs and control data, and is also used as a work memory of the microprocessor 11. The logical volume management program 20, dynamic storage extent allocation program 21 and remote copy management program 22, as well as the storage extent management table 23 and difference management bitmap 24 described later are also retained in the memory 12.

The storage control unit 13 is an interface to the internal storage 14 and, for instance, exchanges with such internal storage 14 the user data to be written provided from the host system 2 or the user data read from the internal storage 14 according to a fibre channel protocol.

Each internal storage 14, for instance, is configured from an expensive disk such as a SCSI (Small Computer System Interface) disk or an inexpensive disk such as a SATA (Serial AT Attachment) disk or optical disk.

Each internal storage 14 is operated by the controller 12 according to a RAID system. One or more logical volumes (hereinafter referred to as "logical volumes") are configured in a physical storage extent provided by one or more internal storages 14. And data is stored as block (hereinafter referred to as a "logical block") units of a prescribed size in this logical volume.

Each logical volume is given a unique identifier (hereinafter referred to as a LUN (Logical Unit Number)). In the case of the present embodiment, the combination of this LUN and a unique number (LBA: Logical Block Address) given to each logical block is considered an address, and the input and output of data is conducted by designating such address.

The lower-level port 15 is a port to the second network 6. As with the upper-level port 10, the lower-level port 15 is also given a network address such as a WWN or IP address for uniquely identifying such lower-level port 15 on the second network 6.

The communication control unit 16 functions as an interface between the microprocessor 11 and maintenance terminal 17, and transfers the various commands and data between the microprocessor 11 and maintenance terminal 17.

The maintenance terminal 17 is a computer device used for the maintenance and management of the primary storage apparatus 4, and, for instance, is configured from a laptop personal computer. This maintenance terminal 17 includes a microprocessor 25 for governing the operational control of the overall maintenance terminal 17, an input unit 26 such as a keyboard, switch, pointing device or microphone, and a display unit 27 such as a monitor display.

The secondary storage apparatus 5 is a storage apparatus providing a secondary volume for retaining the backup of user data stored in the primary volume in the primary storage apparatus 4, and is configured by including a plurality of upper-level ports 30, a microprocessor 31, a memory 32, a storage control unit 33, a plurality of internal storages 34, a communication control unit 35 and a maintenance terminal 36.

Among the above, the upper-level port 30, microprocessor 31, storage control unit 33, internal storage 34, communication control unit 35 and maintenance terminal 36 respectively have the same functions as the corresponding locations in the primary storage apparatus 4, and, therefore, the explanation thereof is omitted.

The memory 32 retains various types of control programs and control data, and is also used as a work memory of the microprocessor 31. The logical volume management program 40, remote copy management program 41 and difference management bitmap 42 are also stored in this memory 32.

The second network 6, for instance, is configured from a SAN, LAN, Internet, public line or dedicated line. Communication between the primary storage apparatus 4 and external storage apparatus 7 via the second network 6, for instance, is conducted according to a fibre channel protocol when the second network 6 is a SAN, and conducted according to a TCP/IP protocol when the second network 6 is a LAN.

The external storage apparatus 7, for example, is a storage apparatus for providing to the primary storage apparatus 4 a storage extent to be virtualized, and, for instance, is applicable to a disk array device, optical disk device or magnetic tape device.

(2) Remote Copy Processing and Restoration Processing in Storage System 1

(2-1) AOU Function in Primary Storage Apparatus 4

Next, the AOU function provided to the primary storage apparatus 4 is explained.

In the case of this storage system 1, the primary storage apparatus 4 is equipped with an AOU function that automatically expands the capacity of the primary volume by dynamically allocating a storage extent to the primary volume that will read and write user data.

Figure 2:
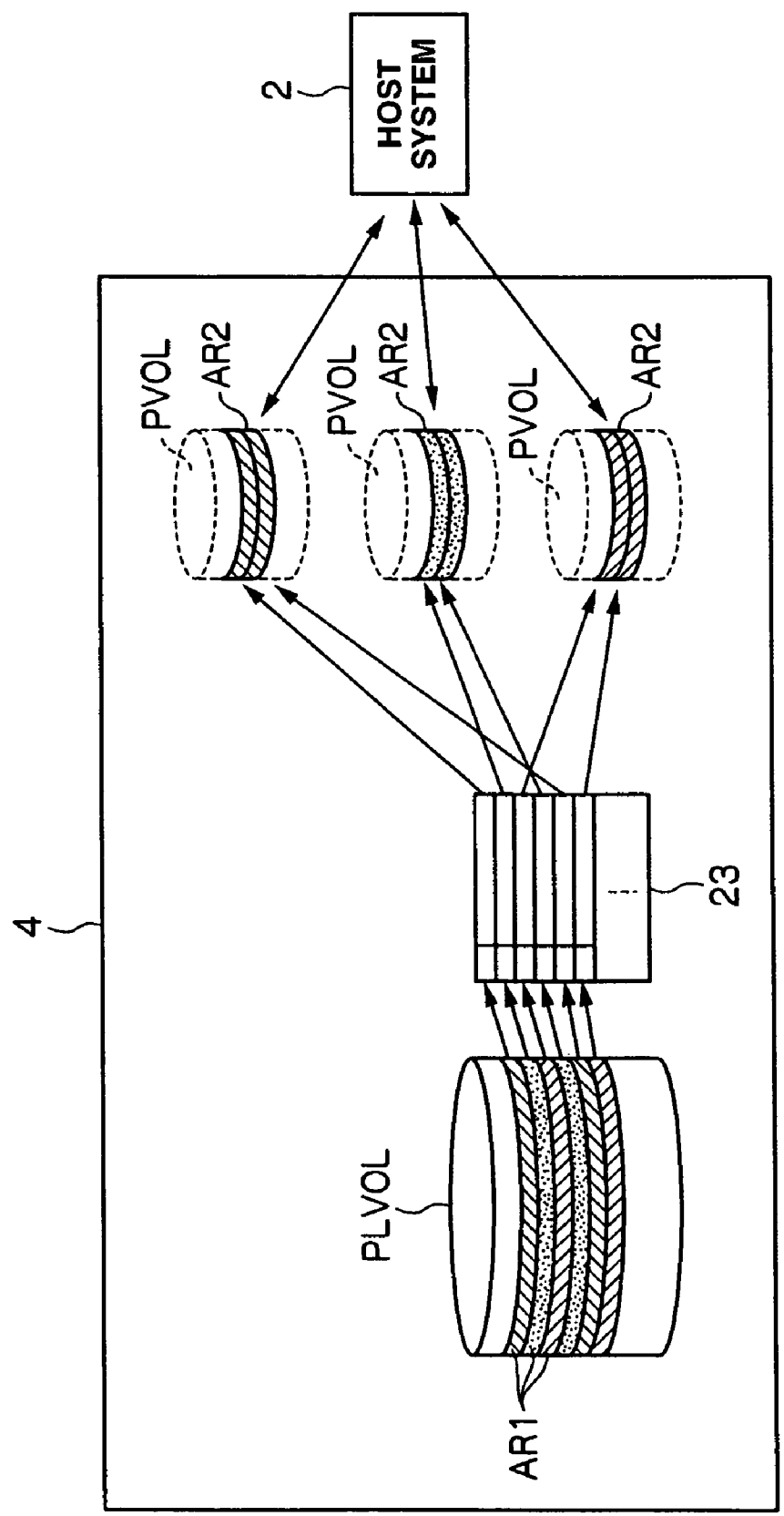
FIG. 2 is a conceptual diagram for explaining the AOU function.

In actuality, the microprocessor (hereinafter referred to as the "primary-side processor") 11 of the primary storage apparatus 4, as shown in FIG. 2, manages the storage extent provided by the internal storage 14 in the primary storage apparatus 4 and the storage extent provided by the external storage apparatus 7 as a single pool volume PLVOL. Further, the primary-side processor 11 provides to the host system 2 a virtual logical volume (virtual volume) created based on the logical volume management program 20 (FIG. 1) stored in the memory 12 as the primary volume PVOL.

And, when the primary-side processor 11 receives a data write request to the primary volume PVOL from the host system and the user data to be written, it allocates a partial storage extent AR1 in the pool volume PLVOL (actually in the internal storage 14 or external storage apparatus 7) to the primary volume PVOL based on the dynamic storage extent allocation program 21 (FIG. 1), and stores this user data to be written in the storage extent AR1 in the pool volume PLVOL allocated to the primary volume PVOL.

Further, here, the primary-side processor 11 manages, with the foregoing storage extent management table 23 (FIG. 1) stored in the memory 12, the correspondence between the storage extent AR1 in the pool volume PLVOL allocated to the primary volume PVOL and the extent AR2 in the primary volume PVOL to which the storage extent AR1 in the pool volume PLVOL was allocated based on the dynamic storage extent allocation program 21 (FIG. 1).

Here, the storage extent management table 23, as shown in FIG. 3 for example, includes at least a "pool volume address" field 23A, a "primary volume number" field 23B and a "primary volume address" field 23C.

Among the above, an address of an extent portion allocated to any one of the primary volumes PVOL among the storage extents AR1 in the pool volume PLVOL is stored in the "pool volume address" field 23A. Further, a LUN of the primary volume PVOL to which an extent portion in the pool volume PLVOL was allocated is stored in the "primary volume number" field 23B, and an address of the extent AR2 to which an extent portion in the pool volume PLVOL was allocated in the primary volume PVOL is stored in the "primary volume address" field 23C.

And, when the primary-side processor 11 allocates the storage extent AR1 in the pool volume PLVOL to any one of the primary volumes PVOL, it registers necessary information in the storage extent management table 23 accordingly.

As a result, when the host system 2 thereafter designates an address in the primary volume PVOL and the data read request of the foregoing user data is given, the primary-side processor 11 refers to the storage extent management table 23, reads the user data from the corresponding address position of the corresponding storage extent AR1 in the pool volume PLVOL, and sends this user data to the host system 2.

Further, even when the data write request to the extent AR2 in the primary volume PVOL to which a storage extent AR1 of the pool volume PLVOL has not yet been allocated and the user data to be written are provided by the host system 2, the primary-side processor 11 also dynamically allocates the storage extent to the primary volume as described above.

Incidentally, the memory 32 of the secondary storage apparatus 5 is not equipped with a program such as the dynamic storage extent allocation program 21 (FIG. 1) in the primary storage apparatus 4, and, therefore, the secondary storage apparatus 5 is explained below as an apparatus that is not equipped with the foregoing AOU function.

(2-2) Outline of Remote Copy Processing and Restoration Processing in Storage System 1

Figure 4:
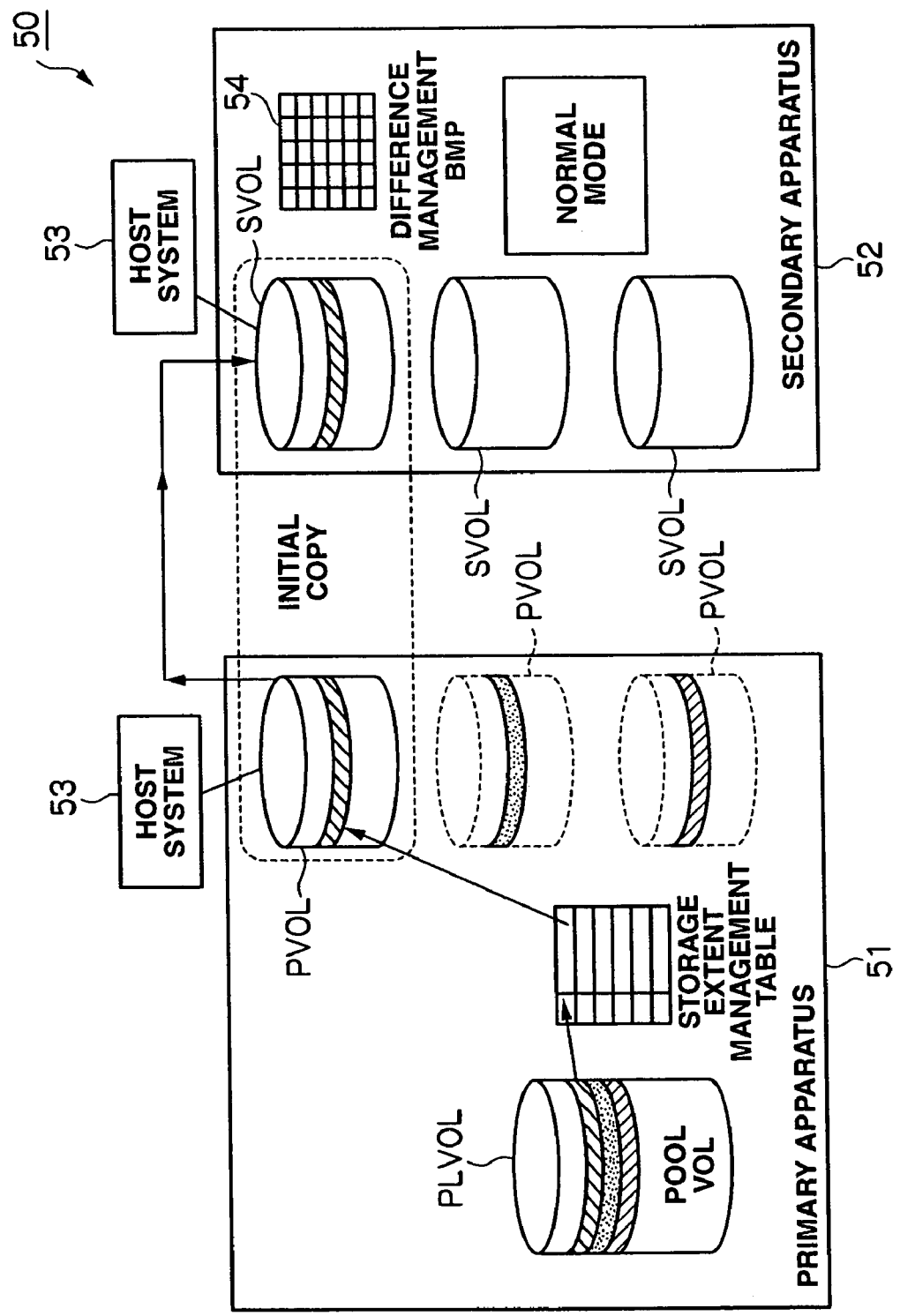
FIG. 4 is a conceptual diagram for explaining the problems of a conventional storage system.

Meanwhile, as shown in FIG. 4, in a conventional storage system 50, upon performing remote copy, foremost, so-called initial copy of configuring the primary volume PVOL in the primary storage apparatus 51 to become the copy source and the secondary volume SVOL in the secondary storage apparatus 52 to become the copy destination in a pair (pair formation), and thereafter mirror-copying all data of the primary volume PVOL to the secondary volume SVOL is performed.

Here, the conventional storage system 50 is performing such initial copy upon normalizing the primary volume PVOL to an actual real volume by respectively allocating the storage extents in the pool volume PLVOL to all extents of the primary volume PVOL on the primary storage apparatus 51 side. Thus, with a conventional storage system 50, during the initial copy, there is a problem in that the data ("0" data) of an extent in the primary volume PVOL to which user data is not actually stored is also transferred to the secondary storage apparatus 52 side, and, as a result, the data transfer efficiency will deteriorate.

Figure 5:
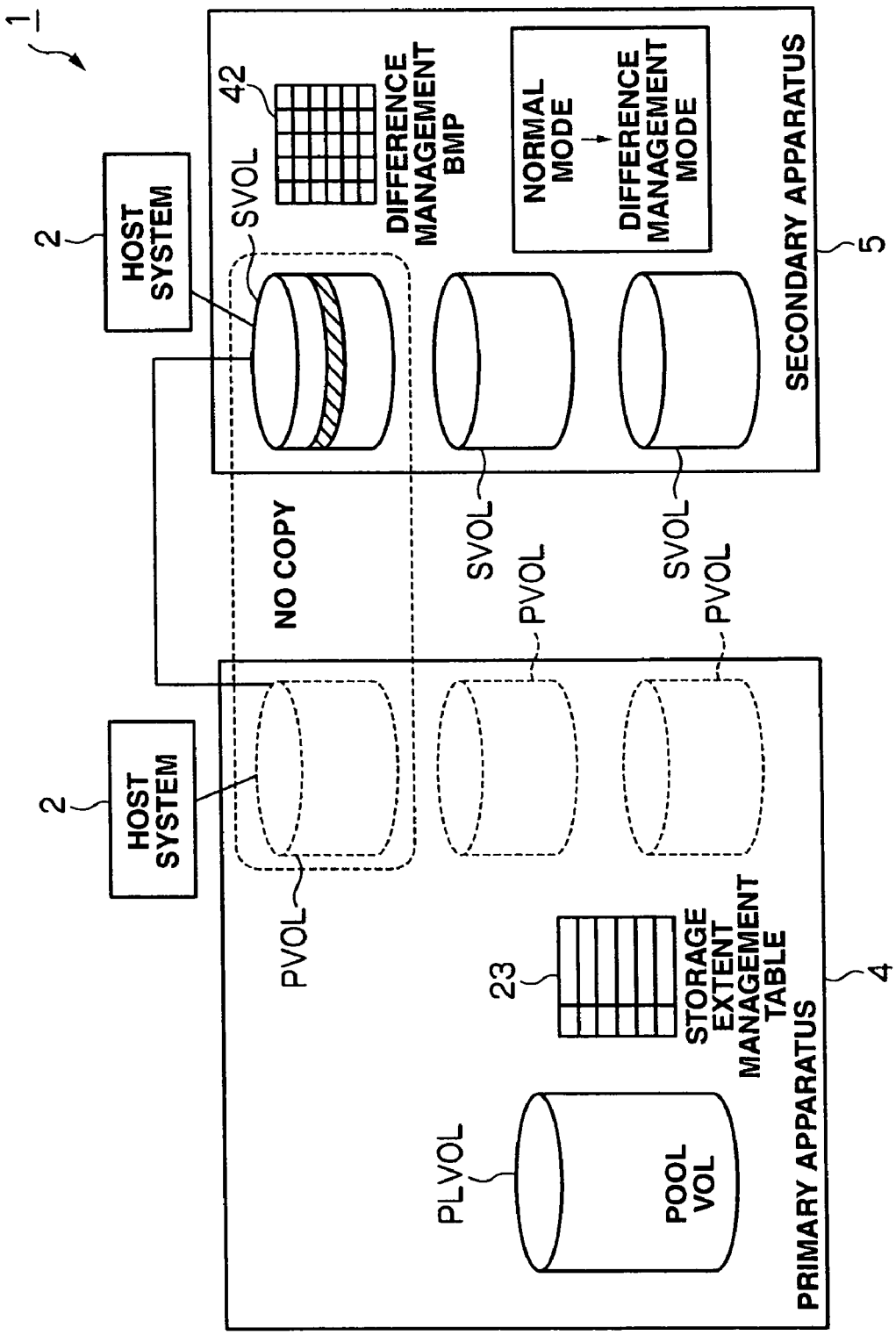
FIG. 5 is a conceptual diagram for explaining the outline of the storage system according to the present embodiment.

Thus, with the storage system 1 according to the present embodiment, when the primary volume PVOL is unused (a state where the storage extent in the pool volume PLVOL is not allocated), as shown in FIG. 5, initial copy is not performed during the pair formation processing (hereinafter referred to as the "pair formation processing") of the primary volume PVOL and secondary volume SVOL to perform the remote copy, and a "No Copy" mode of only performing the pair configuration of the primary volume PVOL and secondary volume SVOL is used.

Figure 6:
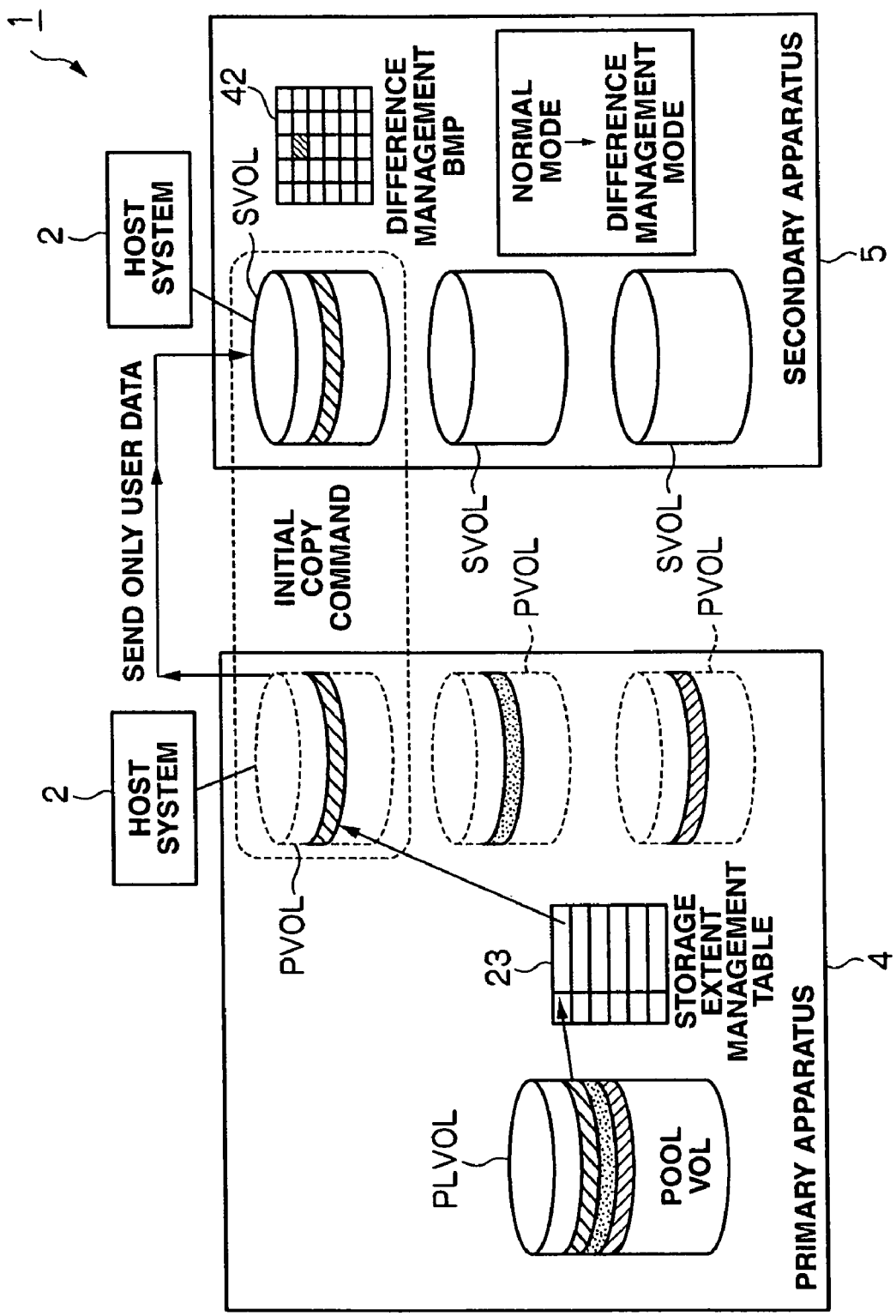
FIG. 6 is a conceptual diagram for explaining the outline of the storage system according to the present embodiment.

Further, with this storage system 1, when the primary volume PVOL is used (a state where the storage extent in the pool volume PLVOL has been allocated), as shown in FIG. 6, during the pair formation processing, only a command for storing the "0" data in the storage extent in the corresponding secondary volume SVOL is sent from the primary storage apparatus 4 to the secondary storage apparatus 5 without sending the "0" data regarding extents that are not storing the user data in the primary volume PVOL (first initial copy mode), or only the user data is sent from the primary storage apparatus 4 to the secondary storage apparatus 5 after storing the "0" data in all storage extents of the secondary volume SVOL (second initial copy mode).

Thereby, with this storage system 1, during the pair formation processing, it is possible to improve the data transfer efficiency between the primary storage apparatus 4 and secondary storage apparatus 5 without unnecessary data being sent from the primary storage apparatus 4 to the secondary storage apparatus 5.

Figure 7:
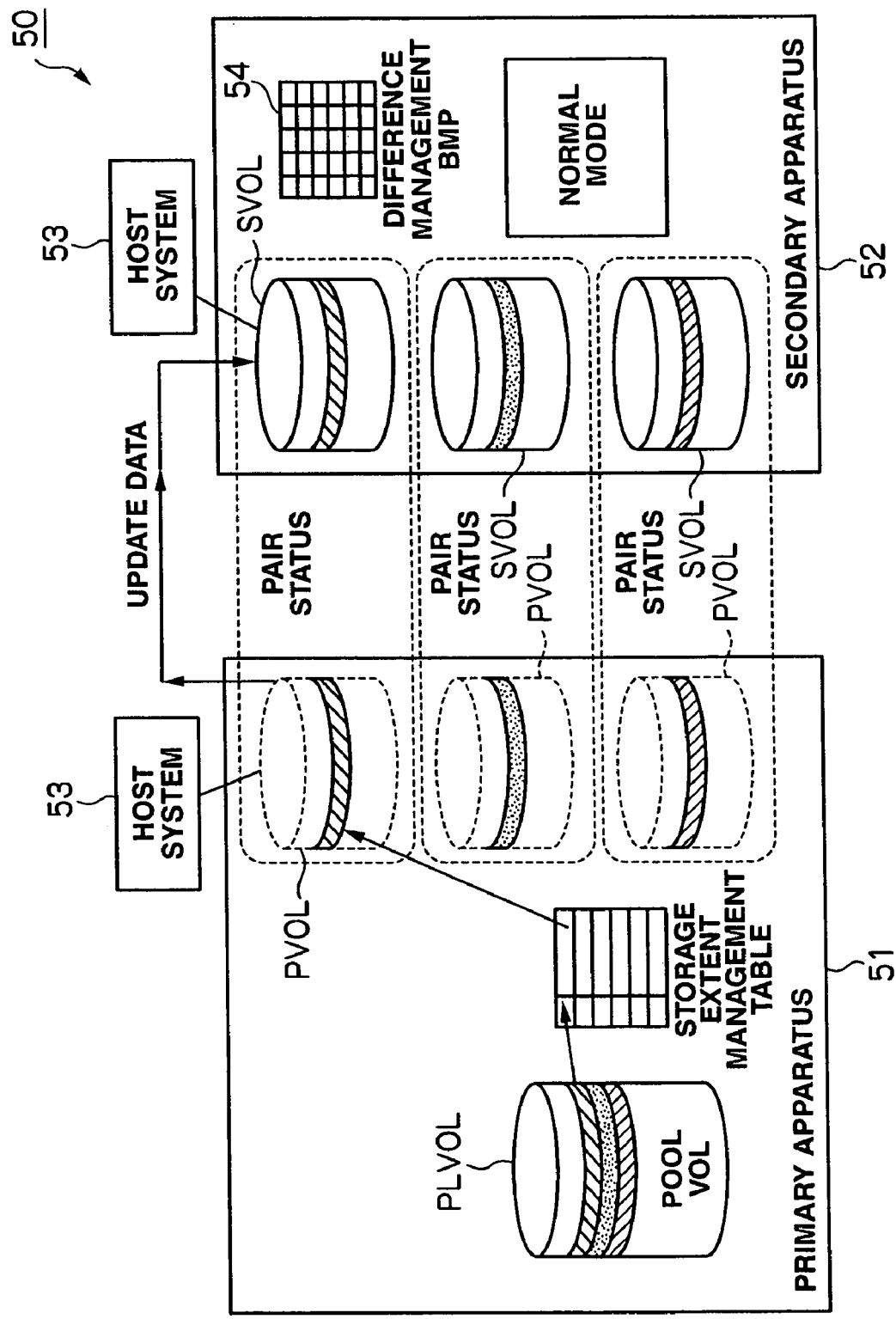
FIG. 7 is a conceptual diagram for explaining the problems of a conventional storage system.

Meanwhile, with the conventional storage system 50, as shown in FIG. 7, during the remote copy processing, the user data (hereinafter referred to as the "updated data") written from the host system 2 to the primary volume PVOL is transferred from the primary storage apparatus 51 to the secondary storage apparatus 52, and processing for storing this updated data in the corresponding address position in the secondary volume SVOL is performed on the secondary storage apparatus 52 side.

In this case, on the secondary storage apparatus 52 side, although the difference management bitmap table 54 is used to manage which data of which block has been updated when the host system 53 directly updates the data in the secondary volume SVOL, no management is performed regarding which block in the secondary volume SVOL has been updated based on the updated data sent from the primary storage apparatus 51.

Figure 8:
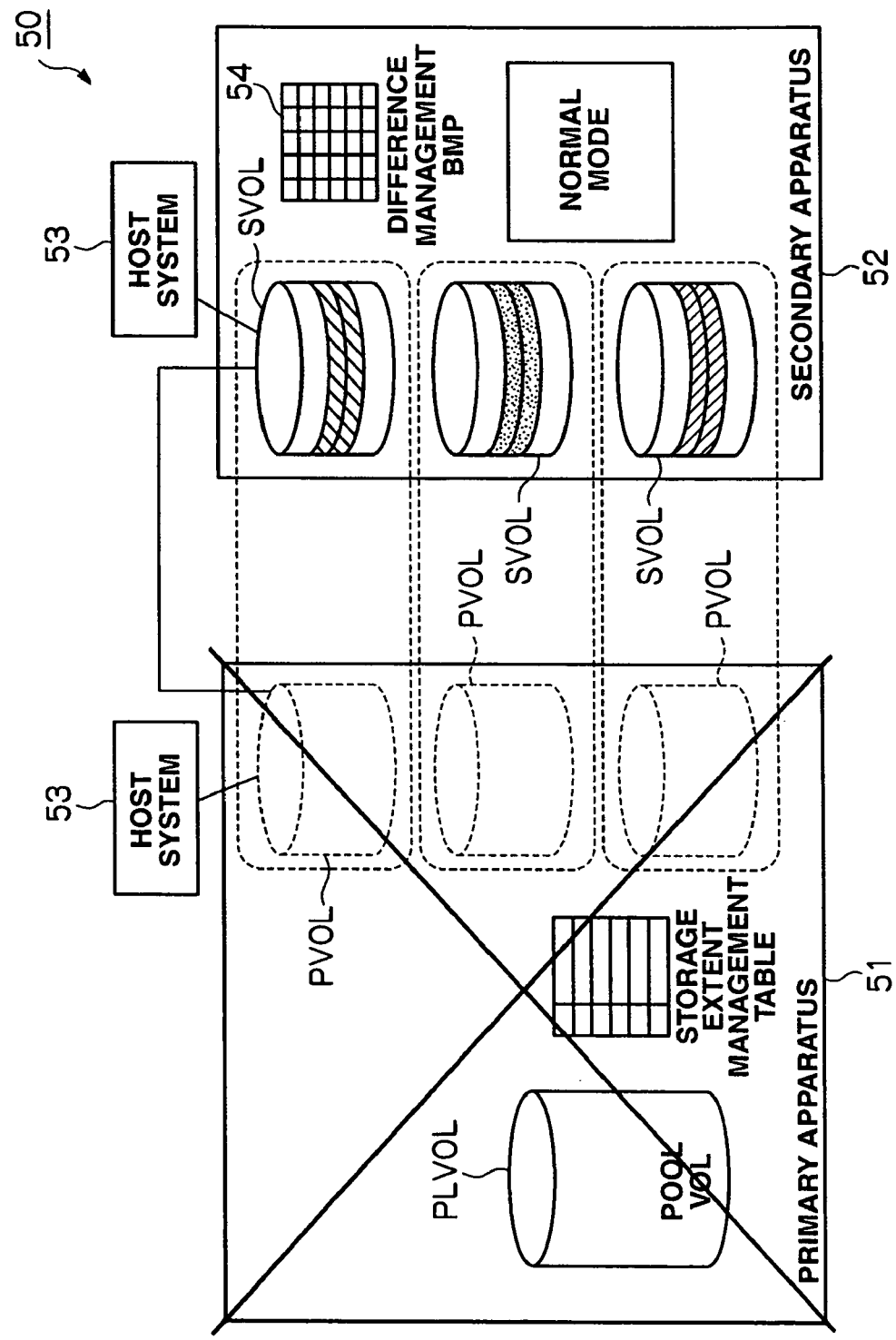
FIG. 8 is a conceptual diagram for explaining the problems of a conventional storage system.
Figure 9:
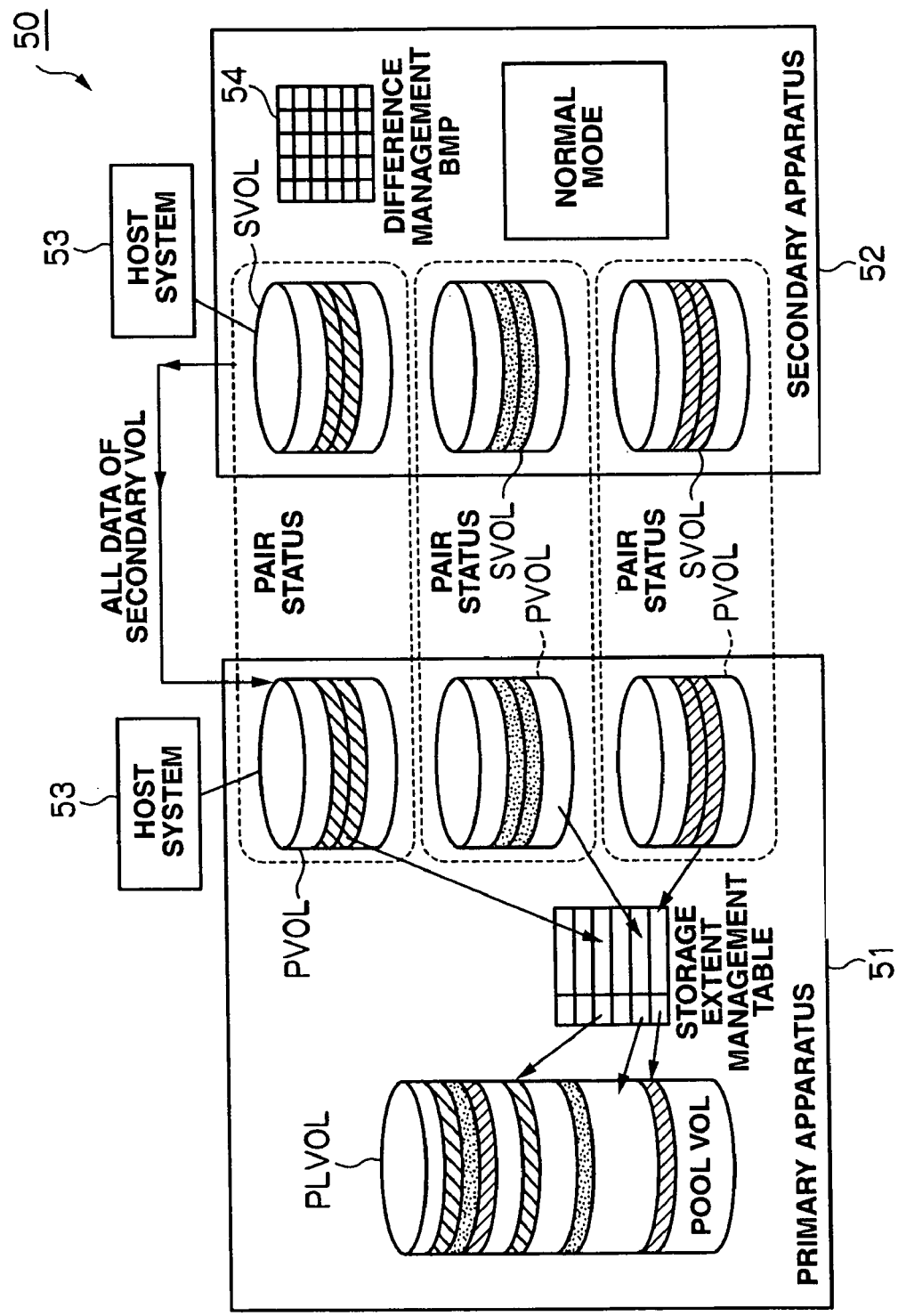
FIG. 9 is a conceptual diagram for explaining the problems of a conventional storage system.

Moreover, with the conventional storage system 50, when the primary storage apparatus 51 encounters a disaster and a failure occurs to all or a part of the primary storage apparatus 51 as shown in FIG. 8, all data in the secondary volume SVOL is copied to the primary volume PVOL when restoring the primary volume PVOL subject to a failure with the data of the corresponding secondary volume SVOL in the secondary storage apparatus 52 as shown in FIG. 9.

Thus, in this conventional storage system 50, as with the case of initial copy, even data ("0" data) of an extent in the secondary volume SVOL that is not actually storing the data is transferred and copied to the primary storage apparatus 51 side. As a result, the storage extent in the pool volume PLVOL is allocated even to the unnecessary extent in the primary volume PVOL, and there is a problem in that the storage extent in the pool volume PLVOL is consumed more than necessary. This kind of problem occurs when the secondary storage apparatus 52 is not equipped with the AOU function.

Figure 10:
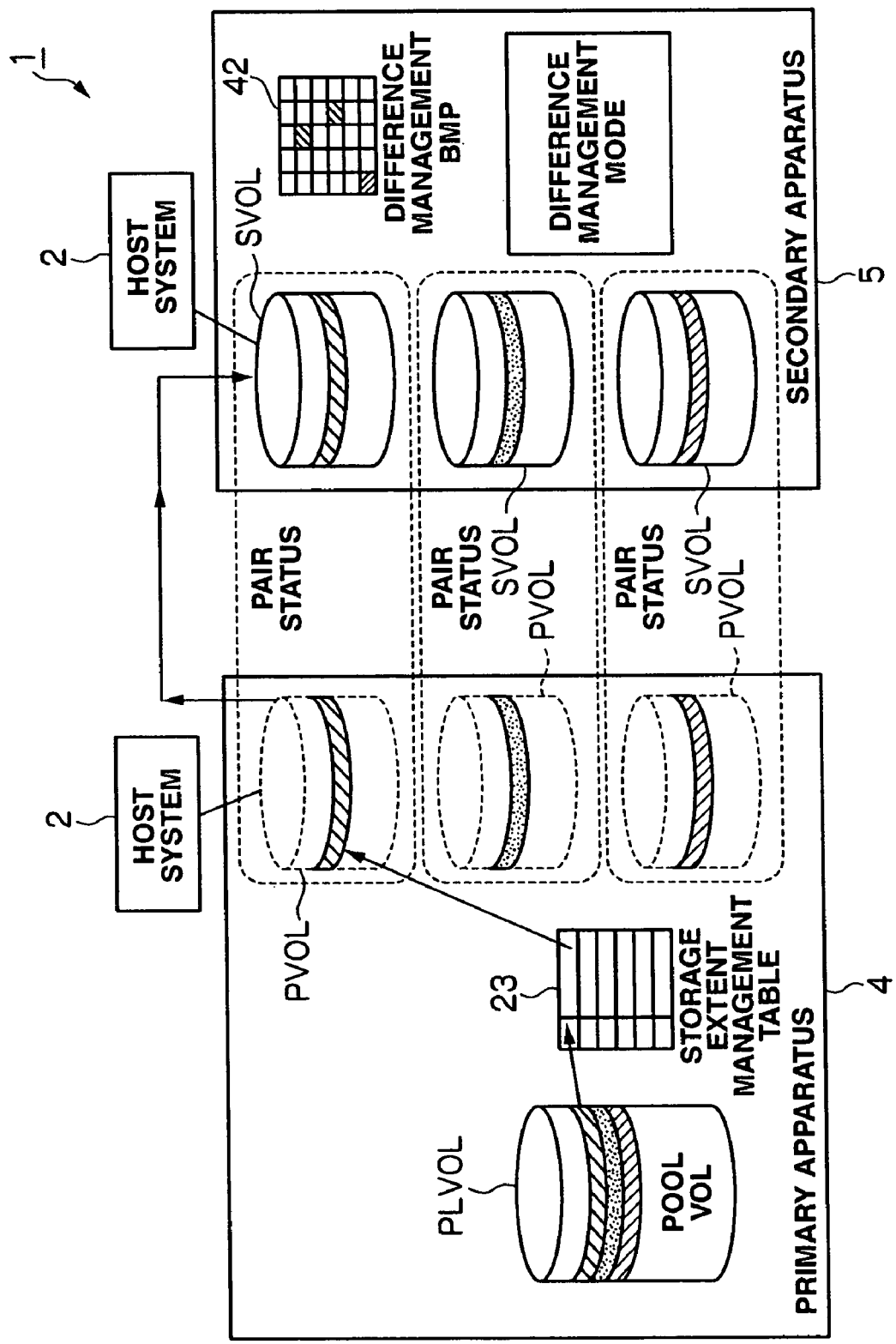
FIG. 10 is a conceptual diagram for explaining the outline of the storage system according to the present embodiment.
Figure 11:
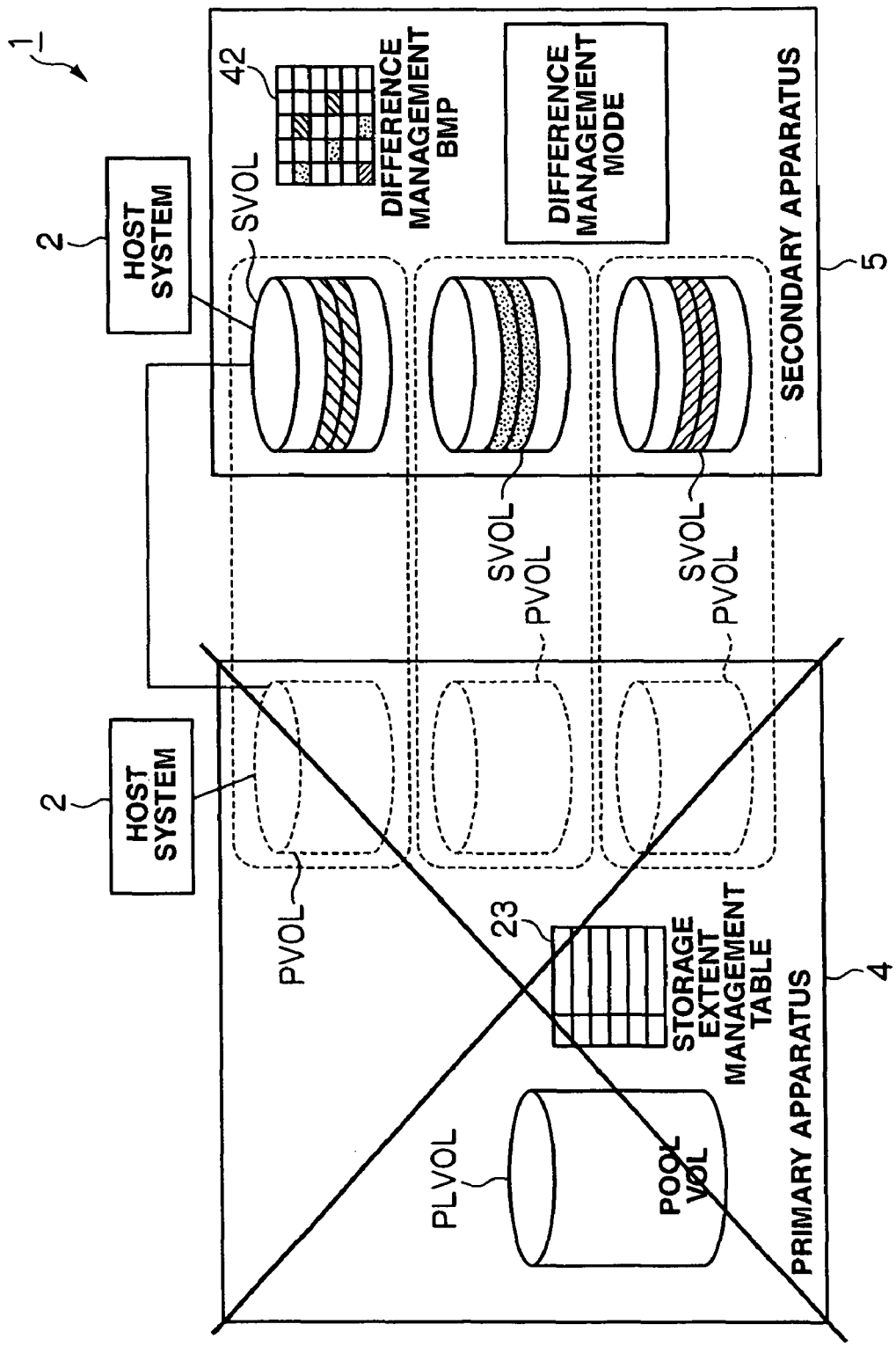
FIG. 11 is a conceptual diagram for explaining the outline of the storage system according to the present embodiment.
Figure 12:
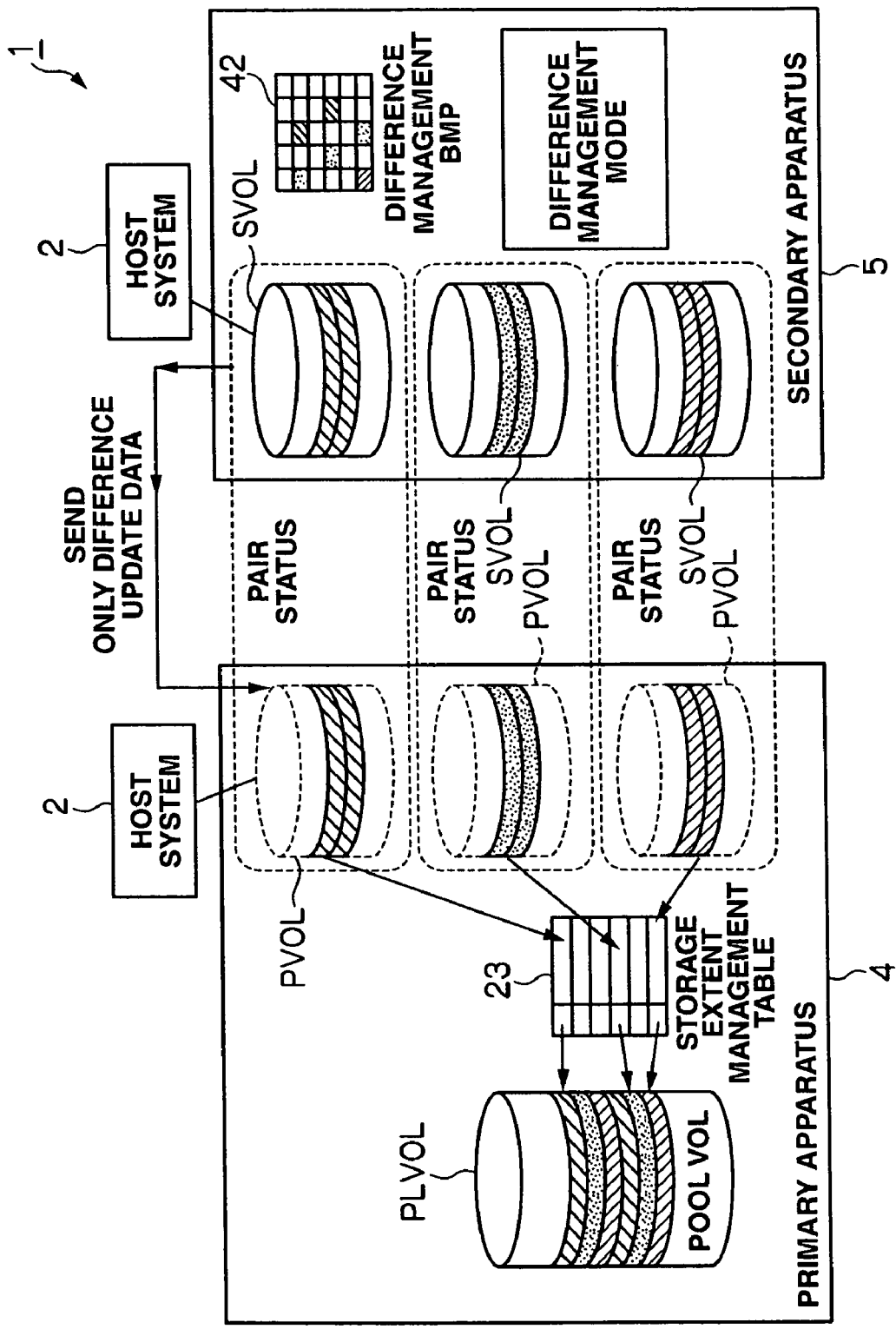
FIG. 12 is a conceptual diagram for explaining the outline of the storage system according to the present embodiment.

Thus, with the storage system 1 according to the present embodiment, when the secondary storage apparatus 5 is a storage apparatus not equipped with the AOU function, remote copy processing is performed on this secondary storage apparatus 5 side in a processing mode (hereinafter referred to as the "difference management mode") of storing the position in the secondary volume SVOL that has been updated with the remote copy as management information using the difference management bitmap 42. As a result, when the primary storage apparatus 51 is subject to a disaster, as shown in FIG. 10, the secondary storage apparatus 52 will manage the data of the primary volume PVOL before encountering the disaster as a difference using the difference management bitmap 42.

And, with this storage system 1, when the secondary storage apparatus is not equipped with the AOU function, during the recovery processing of the primary volume PVOL, only the updated data of the block updated in the secondary volume SVOL is coped to the primary volume PVOL. Thereby, in this storage system 1, during the recovery of the primary volume PVOL, it is possible to effectively prevent allocating the storage extent of the pool volume PLVOL even to an extent that was not storing user data before a failure occurred in the primary volume PVOL, and it is also possible to improve the data transfer efficiency between the primary storage apparatus 4 and secondary storage apparatus 5 during the restoration processing.

(2-3) Secondary Storage Registration Dialog Box 60 and Initial Copy Mode Configuration Dialog Box 70

Figure 13:
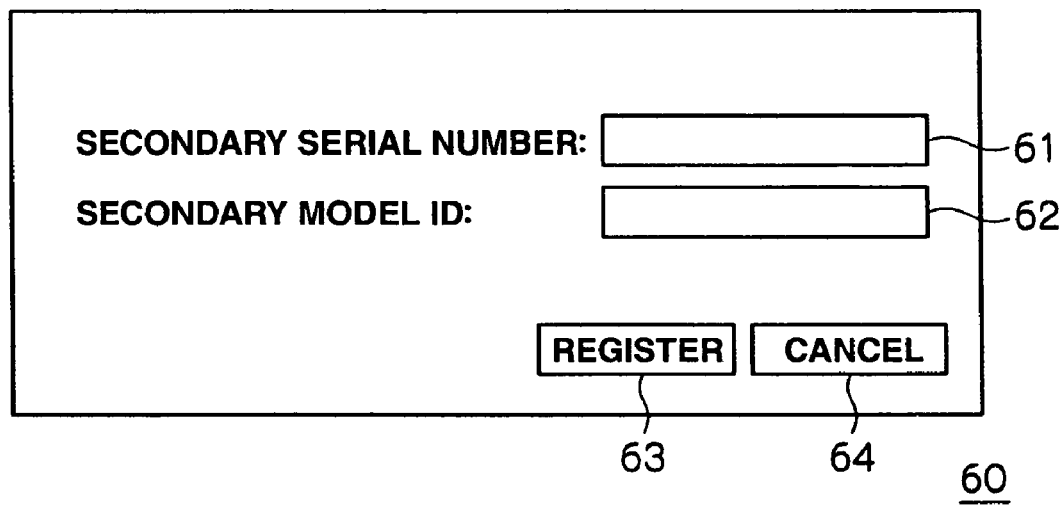
FIG. 13 is a schematic diagram showing the secondary storage registration dialog box.

FIG. 13 shows a secondary storage registration dialog box 60 that can be displayed on the display unit 27 (FIG. 1) of the maintenance terminal 17 (FIG. 1) of the primary storage apparatus 4 based on prescribed operations.

This secondary storage registration dialog box 60 is a dialog box for registering in the primary storage apparatus 4 the serial number and model ID of the secondary storage apparatus 5 to become the information for making the decision on whether the secondary storage apparatus 5 is a storage apparatus supporting the AOU function.

In actuality, this secondary storage registration dialog box 60 is provided with a secondary serial number entry column 61 for entering the serial number of the secondary storage apparatus 5, and a secondary model ID entry column 62 for entering the model ID of the secondary storage apparatus 5. And, the system administrator is able to operate the input unit 26 of the maintenance terminal 17 to enter the serial number and model ID of the secondary storage apparatus 5 respectively in the secondary serial number entry column 61 and secondary model ID entry column 62 of the secondary storage registration dialog box 60.

Further, provided below the secondary storage registration dialog box 60 are a registration button 63 for registering the serial number and model ID of the secondary storage apparatus 5 entered into the secondary serial number entry column 61 and secondary model ID entry column 62, and a cancel button 64 for canceling the serial number and model ID of the secondary storage apparatus 5 entered into the secondary serial number entry column 61 and secondary model ID entry column 62.

In the primary storage apparatus 4, when the registration button 63 is clicked, the serial number and model ID of the secondary storage apparatus respectively entered into the secondary serial number entry column 61 and secondary model ID entry column 62 of the secondary storage registration dialog box 60 are loaded into the maintenance terminal 17, and such information (hereinafter referred to as "secondary storage serial number and model ID information") is retained in the memory (not shown) in the maintenance terminal 17.

Figure 14:
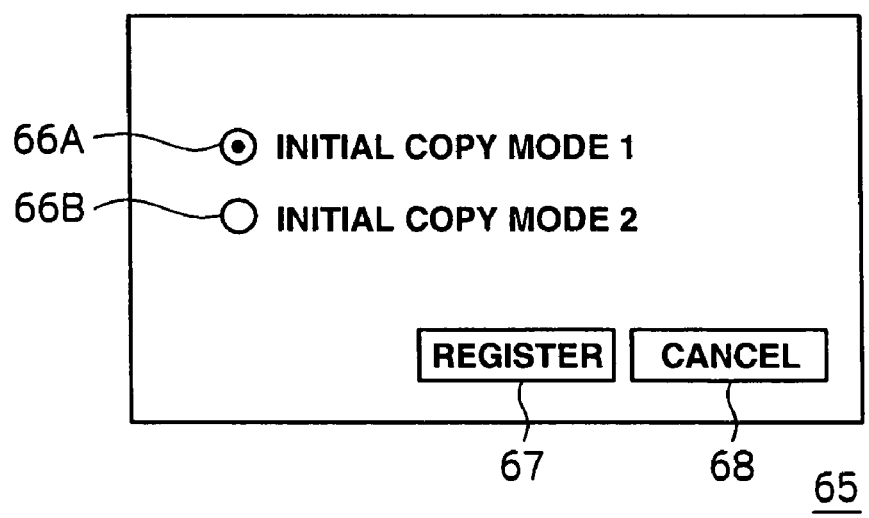
FIG. 14 is a schematic diagram showing the initial copy mode configuration dialog box.

Meanwhile, FIG. 14 shows an initial copy mode configuration dialog box 65 that may be displayed, as with the secondary storage registration dialog box 60, on the display unit 27 of the maintenance terminal 17 of the primary storage apparatus 4 based on prescribed operations.

This initial copy mode configuration dialog box 65 is a dialog box for setting whether the initial copy is to be performed in the processing mode of the first initial copy mode or second initial copy mode described above upon performing the initial copy between the primary volume PVOL and secondary volume SVOL.

In actuality, this initial copy mode configuration dialog box 65 is provided with, as shown in FIG. 14, first and second radio buttons 66A, 66B respectively corresponding to the first initial copy mode ("initial copy mode 1") and second initial copy mode ("initial copy mode 2"). And, the system administrator is able to operate the input unit 26 of the maintenance terminal 17 and turn ON one among the first and second radio buttons 66A, 66B, and thereby select a mode associated with the first or second radio buttons 66A, 66B turned ON among the first and second initial copy modes as the processing mode of initial copy.

Further, provided below the initial copy mode configuration dialog box 65 are a registration button 67 for registering the first or second initial copy mode selected by the system administrator as the processing mode during initial copy, and a cancel button 68 for canceling the first or second initial copy mode selected by the system administrator without registering it as the processing mode during initial copy.

And, in the primary storage apparatus 4, when the registration button 67 is clicked, the first or second initial copy mode selected in the initial copy mode configuration dialog box 65 is loaded into the maintenance terminal 17 as the processing mode upon performing the initial copy between the primary volume PVOL and secondary volume SVOL, and such information (hereinafter referred to as the "registered initial copy mode information") is retained in the memory (not shown) in the maintenance terminal 17.

(2-4) Processing of Respective Microprocessors in Relation to Remote Copy Processing Next, the processing contents of the microprocessor (primary-side processor) 11 of the primary storage apparatus and the microprocessor (hereinafter referred to as the "secondary-side processor") 31 of the secondary storage apparatus 5 concerning the remote copy processing are explained.

Figure 15:
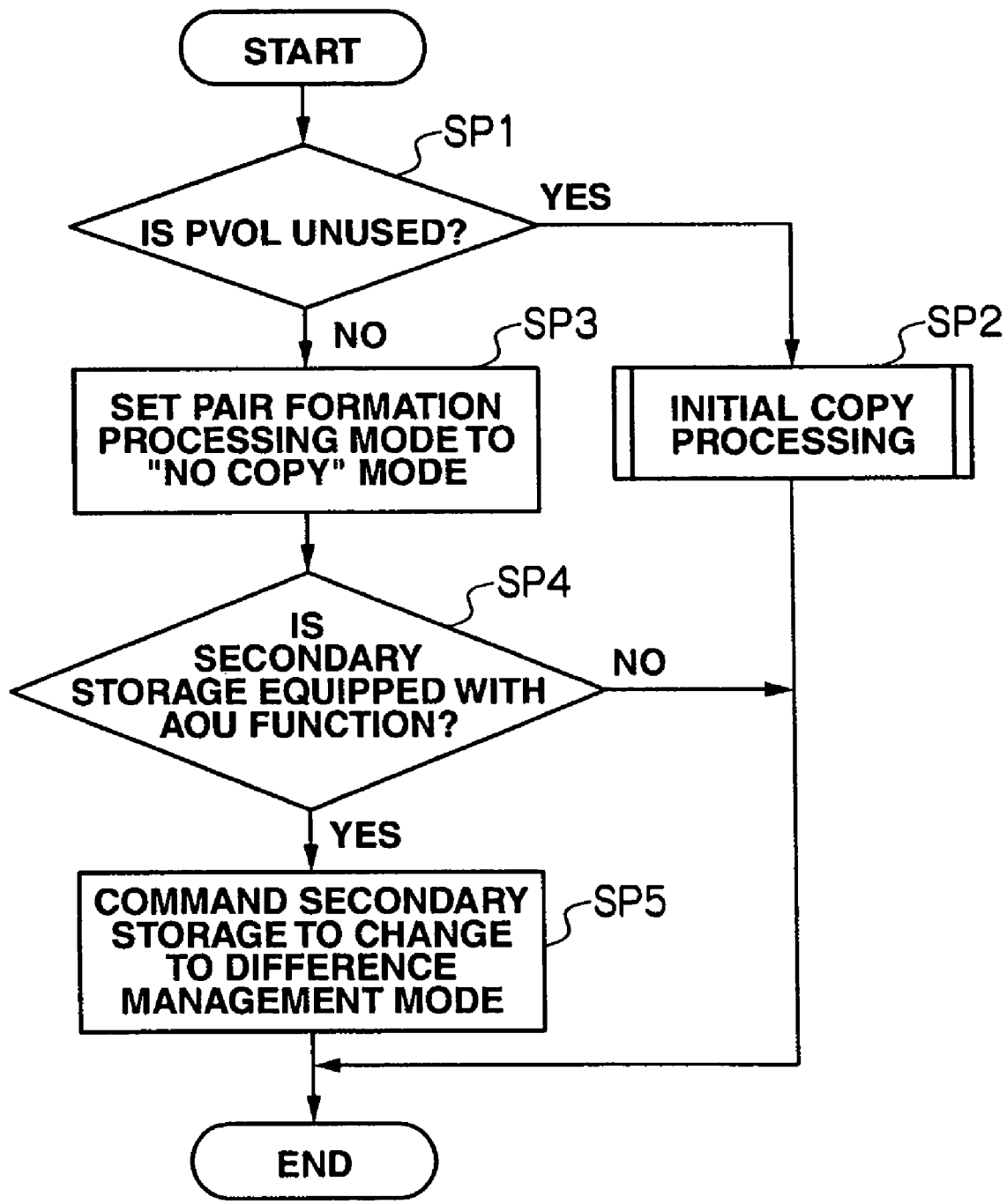
FIG. 15 is a flowchart showing the processing contents of the primary-side processing in relation to pair formation processing.

(2-4-1) Processing of Respective Microprocessors During Pair Formation Processing FIG. 15 is a flowchart showing the processing contents of the primary-side processor 11 during the foregoing pair formation processing. The primary-side processor 11 performs the pair formation processing shown in FIG. 15 based on the remote copy management program 22 stored in the memory 12 of the primary storage apparatus 4.

In other words, for example, when the maintenance terminal 17 is operated and an order for forming a copy pair respectively designating the primary volume PVOL and secondary volume SVOL is input, the primary-side processor 11 commences this pair formation processing, and foremost determines whether the designated primary volume PVOL is unused based on the storage extent management table 23 (SP1).

And, when the primary-side processor 11 obtains a positive result in this determination, it executes the initial copy processing described later in cooperation with the secondary-side processor 31 (FIG. 1) (SP2), and thereafter ends the pair formation processing.

Contrarily, when the primary-side processor 11 obtains a negative result in this determination, it sets the processing mode of the pair formation processing to the "No Copy" mode (SP3). Therefore, initial copy is not performed between the primary volume PVOL and secondary volume SVOL.

Next, as a result of the primary-side processor 11 accessing the maintenance terminal 17, it acquires from the maintenance terminal 17 the serial number and model ID of the secondary storage apparatus 5 registered by the system administrator using the foregoing secondary storage registration dialog box 60 (FIG. 13), and determines whether the secondary storage apparatus 5 is a storage apparatus supporting (is equipped with) the AOU function based on the serial number and model ID of the acquired secondary storage apparatus 5 (SP4).

And, when the primary-side processor 11 obtains a positive result in this determination, it commands the secondary storage apparatus 5 to change the processing mode to the foregoing difference management mode (SP5). As a result, the secondary-side processor 31 that received this command will change the processing mode of the remote copy processing to the difference management mode. And, the primary-side processor 11 thereafter ends this pair formation processing.

Figure 16:
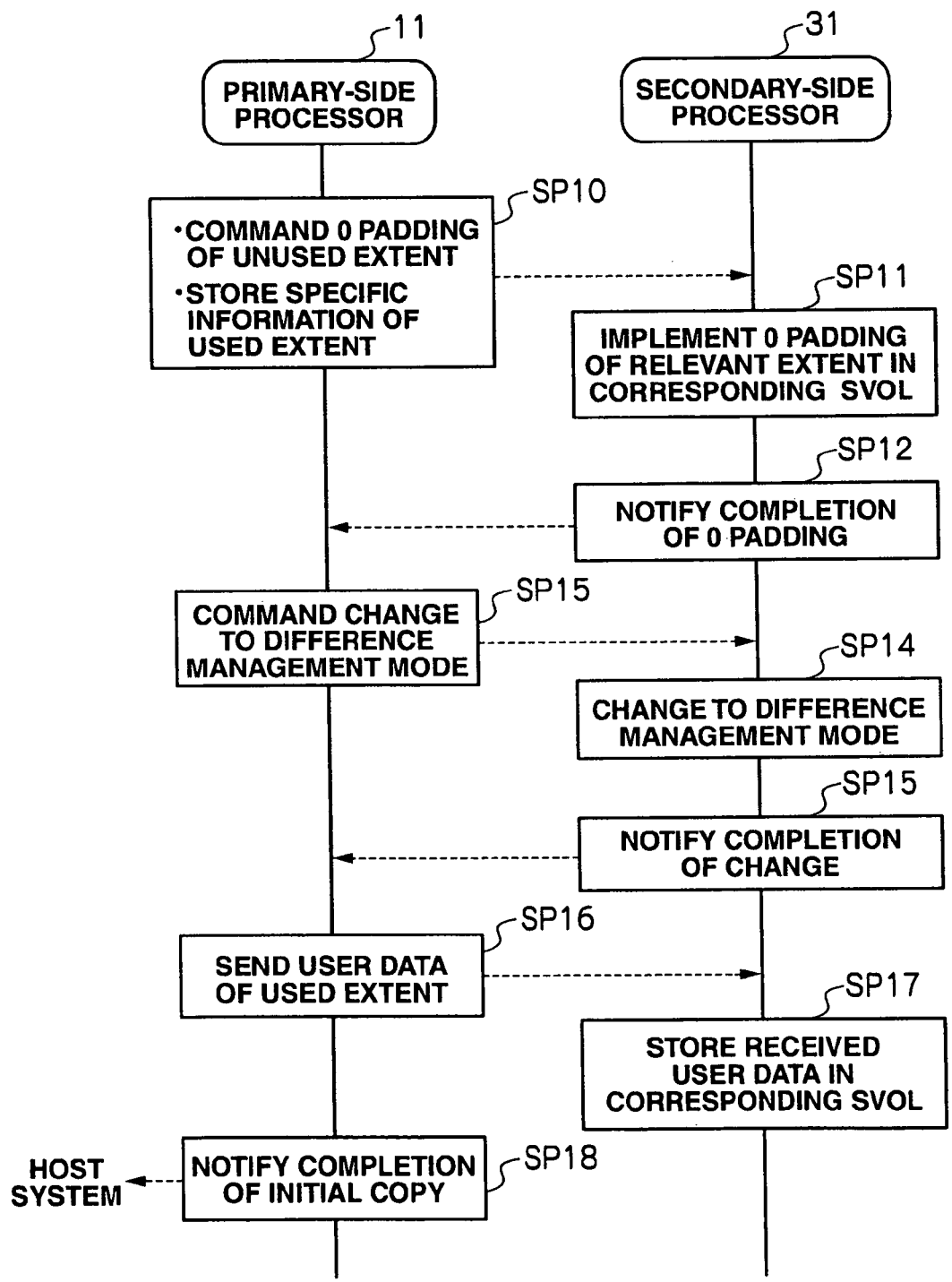
FIG. 16 is a time chart showing the processing contents of the primary-side processor and secondary-side processor in relation to initial copy processing.
Figure 17:
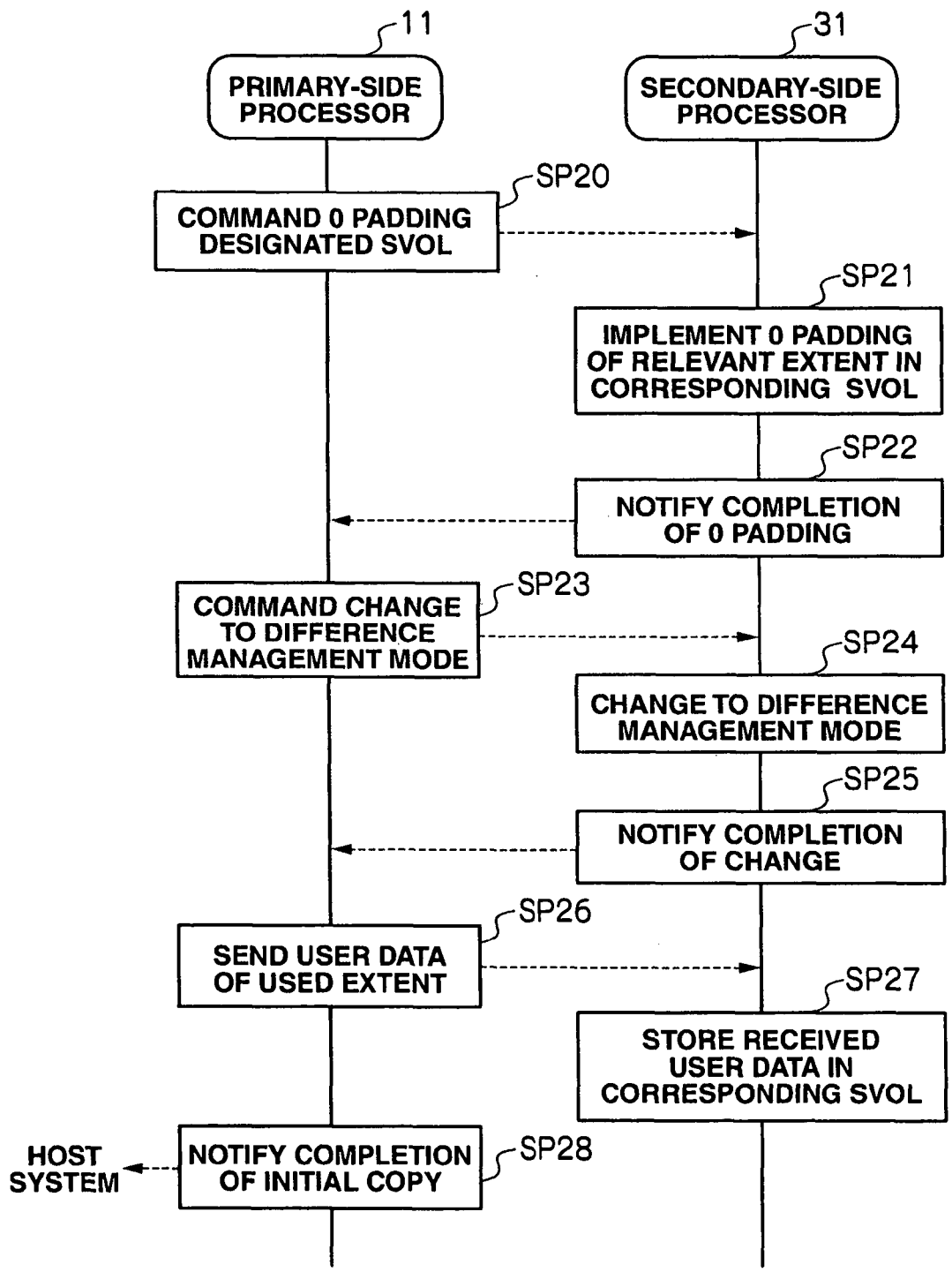
FIG. 17 is a time chart showing the processing contents of the primary-side processor and secondary-side processor in relation to initial copy processing.

Meanwhile, FIG. 16 and FIG. 17 are time charts showing the processing contents of the initial copy processing performed at step SP2 of the foregoing pair formation processing described with reference to FIG. 15. FIG. 16 shows a case where the foregoing first initial copy mode is set as the processing mode of the initial copy, and FIG. 17 shows a case where the foregoing second initial copy mode is set as the processing mode of the initial copy.

The primary-side processor 11 and secondary-side processor 31 respectively perform the initial copy between the primary volume PVOL and secondary volume SVOL based on the remote copy management programs 22, 41 stored in the memories 12, 32 of the own storage apparatus, and according to the processing routine shown in FIG. 16 or FIG. 17.

In actuality, when the first initial copy mode is set as the processing mode of the initial copy (FIG. 16) and the routine proceeds to step SP2 of the foregoing pair formation processing described with reference to FIG. 15, the primary-side processor 11 foremost scans the storage extent in the primary volume PVOL designated by the user in the order of address according to the processing routine shown in FIG. 16, and searches the unused storage extent (hereinafter the "unused extent") that is not storing the user data. And, when the primary-side processor 11 detects the unused extent as a result of such scanning, it designates the range thereof, and sends to the secondary storage apparatus 5 a command (zero padding execution command) for performing so-called zero padding of storing "0" in all corresponding extents in the corresponding secondary volume SVOL. Further, when the primary-side processor 11 detects a storage extent (hereinafter referred to as a "used extent") storing user data as a result of such scanning, it stores in the memory 12 information (hereinafter referred to as "specific information") for specifying the used extent such as the address and size of the used extent (SP10).

Here, when the secondary-side processor 31 receives the zero padding execution command, it performs the zero padding processing to the storage extent portion designated in the zero padding execution command in the corresponding secondary volume (secondary volume designated by the user as a copy destination volume as described above) SVOL (SP11). And, when the secondary-side processor 31 completes this zero padding processing, it notifies the primary storage apparatus 4 to such effect (SP12).

Meanwhile, when the processing of step SP10 regarding all storage extents in the primary volume PVOL is complete, the primary-side processor 11 sends the foregoing difference management mode change command to the secondary storage apparatus 5 (SP13).

When the secondary-side processor 31 receives this difference management mode change command, it changes the processing mode to a difference management mode (SP14), and thereafter provides the primary storage apparatus 4 a completion notice indicating the completion of change of this processing mode (SP15).

Further, when the primary-side processor 11 receives this completion notice, it sequentially sends to the secondary storage apparatus 5 the user data stored in the respective used extents in the primary volume PVOL (SP16). Further, when the secondary-side processor 31 receives this user data, it sequentially stores this in the corresponding storage extent in the corresponding secondary volume SVOL (SP17).

And, the primary-side processor 11 thereafter notifies the completion of initial copy to the host system 12 (SP18). Thereby, the initial copy processing between the primary volume PVOL and secondary volume SVOL designated by the user is thereby ended.

Contrarily, when the processing mode of the initial copy is set as the second initial copy mode (FIG. 17) and the routine proceeds to step SP2 of the foregoing pair formation processing described with reference to FIG. 15, the primary-side processor 11 foremost sends a zero padding execution command indicating that all storage extents in the corresponding secondary volume SVOL should be subject to zero padding to the secondary storage apparatus 5 according to the processing routine shown in FIG. 17 (SP21).

Here, when the secondary-side processor 31 receives the zero padding execution command, it performs the zero padding processing for storing "0" data in all storage extents in the corresponding secondary volume (secondary volume designated by the user as the foregoing copy destination volume) SVOL (SP21). And, when the secondary-side processor 31 completes this zero padding processing, it notifies the primary storage apparatus 4 to such effect (SP22).

Thereafter, the primary-side processor 11 and secondary-side processor 31 perform the processing of step SP23 to step SP28 of FIG. 17 as with step SP13 to step SP18 of the foregoing initial copy processing described with reference to FIG. 16. Thereby, the processing mode of the secondary storage apparatus 5 is changed to the difference management mode, and the user data stored in the respective used extents in the primary volume PVOL is copied to the corresponding extent in the corresponding secondary volume SVOL.

Like this, the primary storage apparatus 4 and secondary storage apparatus 5 perform the initial copy of user data in the primary volume PVOL to the corresponding secondary volume SVOL according to a routine according to the first or second copy mode set by the user at step SP2 of the pair formation processing.

(2-4-2) Processing of Respective Microprocessors During Remote Copy Processing

Figure 18:
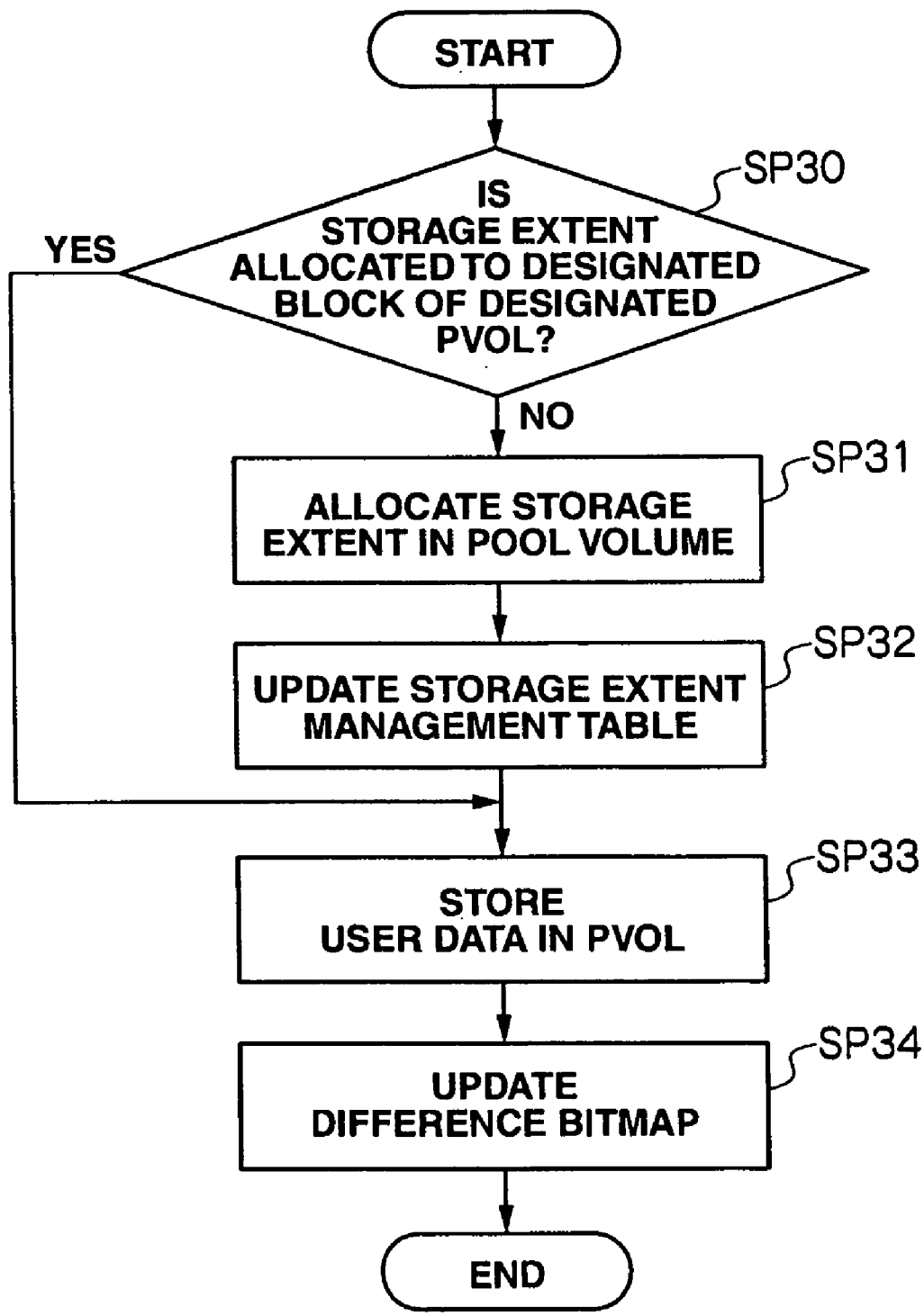
FIG. 18 is a flowchart showing the processing contents of the primary-side processor in relation to remote copy processing.

FIG. 18 is a flowchart showing the processing contents of the primary-side processor 11 upon writing the user data provided by the host system 2 in the primary volume PVOL during the foregoing remote copy processing. The primary-side processor 11 performs the write processing of user data in the primary volume PVOL based on the remote copy management program 22 (FIG. 1) stored in the memory 12 and according to the processing routine shown in FIG. 18.

In other words, after the foregoing pair formation processing is complete and the data write request and user data to be written are sent from the host system 2, the primary-side processor 11 starts this data write processing, and foremost determines whether the storage extent in the pool volume PLVOL has already been allocated to the designated block in the primary volume PVOL designated as the write destination of the user data in the data write request (SP30).

And, when the primary-side processor 11 obtains a negative result in this determination, it proceeds to step SP33, and, contrarily, when the primary-side processor 11 obtains a positive result, it allocates the storage extent in the pool volume PLVOL in prescribed units to the location containing blocks of the primary volume PVOL (SP31).

Further, the primary-side processor 11 thereafter updates the storage extent management table 23 (FIG. 1, FIG. 3) according to the processing at step SP31 (SP32). Specifically, the primary-side processor 11 registers in the storage extent management table 23 the correspondence of the storage extent in the pool volume PLVOL and the extent in the primary volume PVOL to which such storage extent has been allocated.

Thereafter, the primary-side processor 11 stores the user data to be written in an address position designated in the primary volume PVOL designated in the data write request (SP33), and updates the difference management bitmap 24 (FIG. 1) stored in the memory 17 (SP34).

Figures 19, 20:
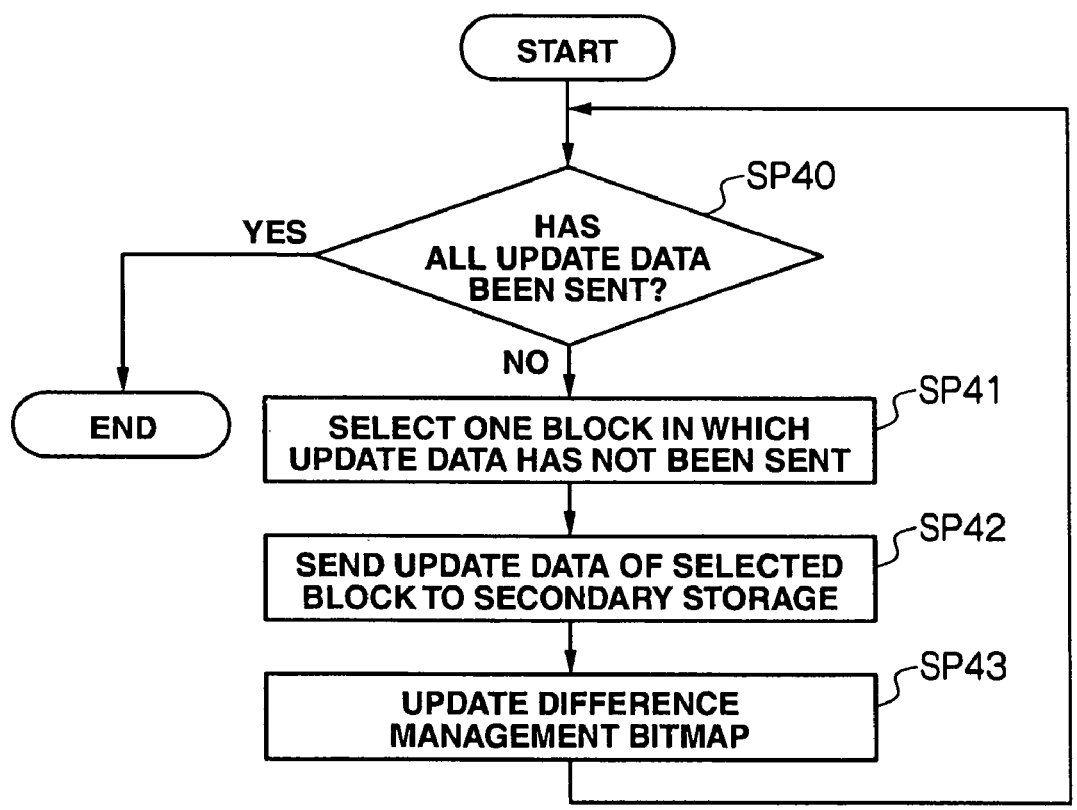
FIG. 19 is a conceptual diagram for explaining the difference management bitmap.
FIG. 20 is a flowchart showing the processing contents of the primary-side processor in relation to remote copy processing.

Here, the difference management bitmap 24 is a bitmap for managing in block units the updated data in the primary volume PVOL that has not yet been transferred to the secondary volume SVOL, and, as shown in FIG. 19, a 1 bit flag is associated and provided to the respective blocks in the pool volume PVOL. Each of these flags is initially reset (set to "0"). And, at step SP34, the primary-side processor 11 updates the difference management bitmap 24 by setting the flag corresponding to the block in the pool volume PVOL in which the user data has been written at step SP33 to "1".

Thereafter, the primary-side processor 11 ends this data write processing.

Meanwhile, the primary-side processor 11 thereafter performs the updated data sending processing of sending the updated data to the secondary storage apparatus 5 based on the remote copy management program 22 (FIG. 1) stored in the memory 12 and according the processing routine shown in FIG. 20.

In other words, the primary-side processor 11 starts the updated data sending processing in a prescribed timing that is asynchronous with the foregoing data write processing, and foremost refers to the difference management bitmap 24 and determines whether all updated data has been sent to the secondary storage apparatus 5 (SP40). Specifically, after sending the updated data of the blocks in the primary volume PVOL to the secondary storage apparatus 5, the primary-side processor 11, as described later, determines whether all flags in the difference management bitmap 24 have been reset at step SP 40 in order to reset the flags in the difference management bitmap 24 associated with such blocks.

And, when the primary-side processor 11 obtains a negative result in this determination, it selects a block in the primary volume PVOL in which the updated data has not been sent to the secondary storage apparatus 5; that is, it selects one block among the blocks in which the corresponding flags in the difference management bitmap 24 are set to "1" (SP41).

Next, the primary-side processor 11 sends to the secondary storage apparatus 5, as updated data, the user data stored at such time in the selected block (SP42), and thereafter resets the flags in the difference management bitmap 24 associated with the block selected at step SP41 (SP43).

Thereafter, the primary-side processor 11 repeats similar processing steps until all updated data is sent to the secondary storage apparatus 5 (step SP40 to step SP43), and, when all updated data is eventually sent to the secondary storage apparatus 5, it ends this updated data sending processing.

Figure 21:
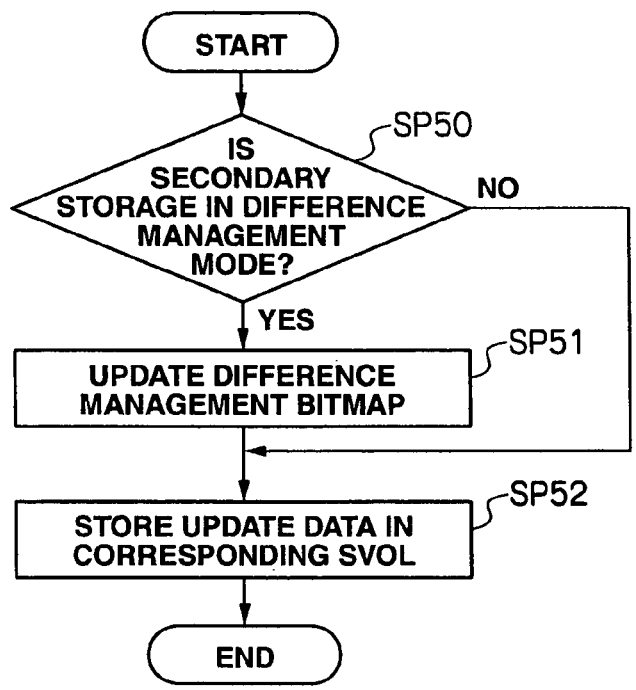
FIG. 21 is a flowchart showing the processing contents of the secondary-side processor in relation to remote copy processing.

Meanwhile, FIG. 21 is a flowchart showing the processing contents of the secondary-side processor 31 during the remote copy processing. The secondary-side processor 31 performs copy processing of storing the updated data sent from the primary storage apparatus 4 in a corresponding address position in the corresponding secondary volume SVOL based on the remote copy management program 41 (FIG. 1) stored in the memory 32 (FIG. 1) in the own storage apparatus (secondary storage apparatus 5) and according to the processing routine shown in FIG. 21.

In other words, when the secondary-side processor 31 receives the updated data from the primary storage apparatus 4, it commences copy processing in a difference management mode, and foremost determines whether the current processing mode of one's own storage apparatus (secondary storage apparatus 5) is in a difference management mode (SP50).

To obtain a negative result in this determination implies that a normal mode is set as the processing mode of the secondary storage apparatus 5. As a result, here, the secondary-side processor 31 stores the received updated data in the corresponding address position of the corresponding secondary volume SVOL (SP52), and thereafter ends this copy processing. Therefore, in this case, even when the updated data is written in the secondary volume SVOL, the difference management bitmap 42 (FIG. 1) retained in the memory 32 (FIG. 1) of the secondary storage apparatus 5 is not updated.

Contrarily, to obtain a positive result in the decision at step SP50 implies that a difference management mode is set as the processing mode of the secondary storage apparatus 5. As a result, the secondary-side processor 31 updates the difference management bitmap 42 stored in the memory 32 (SP51).

Here, the difference management bitmap 42 is a bitmap for managing in which block of the secondary volume SVOL the updated data has been stored, and, as with the difference management bitmap 24 on the foregoing primary storage apparatus 4 side described with reference to FIG. 19, a 1 bit flag is associated and provided to the respective blocks in all storage extents provided by the secondary storage apparatus 5. Each of these flags is initially reset (set to "0"). And, the secondary-side processor 31, at step SP51, updates the difference management bitmap 42 by setting the flags corresponding to the blocks in the secondary volume SVOL to which user data was written at step SP51 to "1".

Next, the secondary-side processor 31 stores the updated data in the corresponding address position of the corresponding secondary volume SVOL (SP52), and thereafter ends this copy processing.

Figure 22:
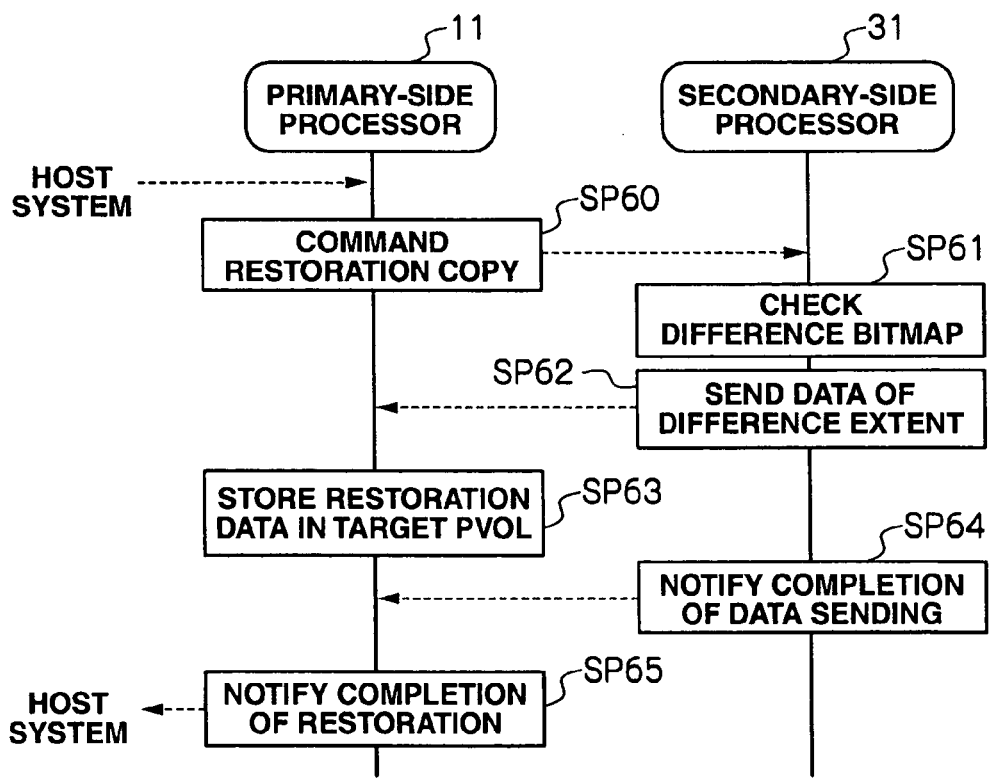
FIG. 22 is a time chart showing the processing contents of the primary-side processor and secondary-side processor in relation to restoration processing.

(2-4-3) Processing of Respective Microprocessors During Restoration Processing FIG. 22 is a time chart showing the processing contents of the primary-side processor 11 and secondary-side processor 31 during the foregoing restoration processing. The primary-side processor 11 and secondary-side processor 31 respectively perform restoration processing for restoring the primary volume PVOL based on the remote copy management programs 22, 41 stored in the memories 12, 32 (FIG. 1) in the own storage apparatus, and according to the processing routine shown in FIG. 22.

In other words, when the primary-side processor 11 receives a command to the effect of restoring the primary volume PVOL sent from the host system 2 upon designating the primary volume PVOL according to the user's operation, it commences the restoration processing, and foremost sends to the secondary storage apparatus 5 a command (hereinafter referred to as a "restoration copy execution command") to the effect of performing restoration copy processing of copying the data of the corresponding secondary volume SVOL to the primary volume PVOL (SP60).

When the secondary-side processor 31 receives this restoration copy execution command, it checks the difference management bitmap 42 retained in the memory 32 (SP61), and sequentially sends to the primary storage apparatus 4, as restored data, only the updated data in the respective blocks in which the corresponding flags are set to "1" in the difference management bitmap 42 among the updated data stored in the corresponding secondary volume SVOL (SP62). Further, here, the primary-side processor 11 sequentially stores the restored data that is sent from the secondary storage apparatus 5 in the corresponding address position in the corresponding primary volume PVOL (SP63).

And, when the secondary-side processor 31 eventually finishes sending, as restored data, to the primary storage apparatus 4 the updated data of all blocks in which the corresponding flags are set to "1" in the difference management bitmap 42 among the updated data stored in the secondary volume SVOL, it sends the restored data sent completion notice to the primary storage apparatus 4 (SP64), and thereafter ends this restoration processing.

Further, when the primary-side processor 11 receives this restored data sent completion notice, it transfers this to the host system 2 (SP65), and thereafter ends this restoration processing.

(3) Effect of Present Embodiment

As described above, with this storage system 1, during the remote copy processing, while remote copying the user data written by the host system 2 in the primary volume PVOL to the corresponding position of the corresponding secondary volume SVOL on the one hand, this position is stored in the second storage apparatus 5 side using the difference management table 42, and, during the restoration processing of the primary volume PVOL, this difference management table 42 is referred to and only the data of the position in the secondary volume SVOL subject to the remote copy is copied from the secondary volume SVOL to the primary volume PVOL so as to restore the primary volume PVOL.

Therefore, with this storage system 1, during the restoration processing of the primary volume PVOL, it is possible to effectively prevent allocating the storage extent of the pool volume PLVOL even to an extent that is not storing user data in the primary volume PVOL. As a result, it is possible to avoid consuming the storage extent of the pool volume PLVOL in the primary storage apparatus 4 more than necessary, improve the usage efficiency of the storage extent in the primary storage apparatus 4, and improve the data transfer efficiency between the primary storage apparatus 4 and secondary storage apparatus 5 during the restoration processing.

Further, with this storage system 1, when the primary volume PVOL is unused during the pair formation processing, pair configuration of the primary volume PVOL and secondary volume SVOL is performed in the "No Copy" mode, and, when the primary volume PVOL is used, only the user data is sent from the primary storage apparatus 4 to the secondary storage apparatus 5, and zero padding is performed on the secondary storage apparatus 5 side regarding the storage extent in the secondary volume SVOL corresponding to the unused extent in the primary volume PVOL.

Therefore, with this storage system 1, during the pair formation processing, unnecessary data will not be sent from the primary storage apparatus 4 to the secondary storage apparatus 5, and it is possible to improve the data transfer efficiency between the primary storage apparatus 4 and secondary storage apparatus 5.

(4) Other Embodiments

Incidentally, in the foregoing embodiments, although a case was explained where the present invention was applied to the storage system 1 using a storage apparatus that is not supporting the AOU function as the secondary storage apparatus 5 (second storage apparatus), the present invention is not limited thereto, and may also be applied to cases where a storage apparatus supporting the AOU function is used as the secondary storage apparatus 5.

Here, for example, the difference management table 42 for managing the position in the secondary volume SVOL updated based on the updated data sent from the first storage apparatus to the second storage apparatus, and the difference management table 42 for managing the position in the secondary volume SVOL directly updated by the host system 2 may be provided separately, and, during the restoration processing of the primary volume PVOL, by performing the restoration processing using the difference management table 42 of the former, it is possible to prevent the updated contents of the secondary volume SVOL directly updated by the host system 2 from being reflected in the primary volume PVOL.

Further, in the foregoing embodiments, although a case was explained where, in the primary storage apparatus 4, the storage extent allocation unit for dynamically allocating the storage extent to the primary volume PVOL (first volume) as the first volume, and the data sending unit for sending to the secondary storage apparatus 25 the user data written by the host system 2 in the primary volume PVOL are applied to the same single microprocessor 11, the present invention is not limited thereto, and the storage extent allocation unit and data sending unit may be created using different microprocessors or the like.

Similarly, in the foregoing embodiments, although a case was explained where, in the secondary storage apparatus 5, the data write unit for writing user data sent from the primary storage apparatus 4 in the corresponding position in the corresponding secondary volume SVOL, and the data write position management unit for storing, as management information, the position in which the user data from the primary storage apparatus 4 in the secondary volume SVOL was written are applied to the same single microprocessor 31, the present invention is not limited thereto, and the storage extent allocation unit and data sending unit may be created using different microprocessors or the like.

What is claimed is:

1. A storage apparatus coupled to a host system and another storage apparatus, which have a plurality of logical volumes and a processor, comprising:

a plurality of logical volumes, a processor which allocates a storage extent of a first volume of said plurality of logical volumes in said storage apparatus to a virtual volume when said storage apparatus receive a write request to said virtual volume from said host system, wherein said virtual volume of said storage apparatus is pair-configured with a second logical volume of said a plurality of logical volumes in said another storage apparatus, said processor of said another storage apparatus sends data written by said host system into said virtual volume to said second volume in said another storage apparatus, so that said data is written into said second volume, wherein said processor of said storage apparatus, in a initial copy procedure, sends a data of value 0 to an address position in said second volume corresponding an address position in said virtual volume that has not been allocated to said first volume, and sends a data stored in said virtual volume to an address position in said second volume corresponding an address position in said virtual volume that already has been allocated to said first volume.

2. The storage apparatus according to claim 1, wherein said storage apparatus and said another second storage apparatus pair configures said virtual and second volumes without initially copying data from said virtual volume to said second volume when said virtual volume is an unused volume that is not stored with data.

3. The storage system according to claim 1,

Wherein, when said virtual volume is a used volume storing with data, said data is initially copied from said virtual volume to said second volume by sending said data stored in said virtual volume from said storage apparatus to said another storage apparatus, and said another storage apparatus then stores data of value 0 to an address position in a storage extent in said second volume corresponding to an address position in the storage extent allocated to said virtual volume that is not stored with said data.

4. The storage apparatus according to claim 1, wherein said storage apparatus determines whether said another storage apparatus is supporting a function of allocating a storage extent to said second volume based on pre-registered identifying information of said another storage apparatus, and when it determines that said function is not being supported, said storage apparatus moves a processing mode of said another storage apparatus to a different mode for storing management information of the address position in which said data from said storage apparatus into said second volume was written; and wherein said another storage apparatus, during a restoration processing of said virtual volume, refers to said management information and sends to said storage apparatus the management information and said data from said storage apparatus written into said second volume.

5. The storage apparatus according to claim 1, wherein said processor in said another storage apparatus stores said management information of the address position to which said data from said storage apparatus into said second volume was written, and wherein said processor in said another storage apparatus, during a restoration processing of said virtual volume, refers to said management information and sends to said storage apparatus the management information and said data from said storage apparatus written into said second volume.

6. The storage apparatus according to claim 4, wherein said processor in said storage apparatus refers to said management information and said data sent from said another storage apparatus to write said data into a corresponding address position in the primary volume.

7. A method for operating a storage apparatus coupled to a host system and another storage apparatus, each storage apparatus having a plurality of logical volumes and a processor, comprising the steps of:

allocating via the processor a storage extent of a first volume of said plurality of logical volumes in said storage apparatus to a virtual volume when said storage apparatus receive a write request to said virtual volume from said host system;

pair-configuring said virtual volume of said storage apparatus with a second logical volume of said a plurality of logical volumes in said another storage apparatus;

sending via said processor of said another storage apparatus data written by said host system into said virtual volume to said second volume in said another storage apparatus, so that said data is written into said second volume, sending via said processor of said storage apparatus, in a initial copy procedure, a data of value 0 to an address position in said second volume corresponding an address position in said virtual volume that has not been allocated to said first volume; and sending via said processor of said storage apparatus a data stored in said virtual volume to an address position in said second volume corresponding an address position in said virtual volume that already has been allocated to said first volume.

8. The method according to claim 7, wherein said storage apparatus and said another second storage apparatus pair configure said virtual and second volumes without initially copying data from said virtual volume to said second volume when said virtual volume is an unused volume that is not stored with data.

9. The method according to claim 7, wherein when said virtual volume is a used volume storing with data, said data is initially copied from said virtual volume to said second volume by sending said data stored in said virtual volume from said storage apparatus to said another storage apparatus, and said another storage apparatus then stores data of value 0 to an address position in a storage extent in said second volume corresponding to an address position in the storage extent allocated to said virtual volume that is not stored with said data.

10. The method according to claim 7, wherein said storage apparatus determines whether said another storage apparatus is supporting a function of allocating a storage extent to said second volume based on pre-registered identifying information of said another storage apparatus and, when said function is determined as not being supported, said storage apparatus moves a processing mode of said another storage apparatus to a different mode for storing management information of the address position in which said data from said storage apparatus into said second volume was written; and wherein said another storage apparatus, during a restoration processing of said virtual volume, refers to said management information and sends to said storage apparatus the management information and said data from said storage apparatus written into said second volume.

11. The method according to claim 7, wherein said processor in said another storage apparatus stores said management information of the address position to which said data from said storage apparatus into said second volume was written, and wherein said processor in said another storage apparatus, during a restoration processing of said virtual volume, refers to said management information and sends to said storage apparatus the management information and said data from said storage apparatus written into said second volume.

12. The method according to claim 11, wherein said processor in said storage apparatus refers to said management information and said data sent from said another storage apparatus to write said data into a corresponding address position in the primary volume.

* * * * *